United States Patent [19]

Daltrozzo et al.

[11] Patent Number: 4,960,890
[45] Date of Patent: Oct. 2, 1990

[54] METHINE DYES WHICH HAVE AT LEAST ONE HETEROCYCLE CONTAINING TWO NITROGEN ATOMS AND PREPARATION THEREOF

[75] Inventors: Ewald Daltrozzo, Konstanz; Werner Sulger, Ueberlingen-Nussdorf, both of Fed. Rep. of Germany

[73] Assignee: BASF Aktiengesellschaft, Ludwigshafen, Fed. Rep. of Germany

[21] Appl. No.: 417,309

[22] Filed: Oct. 5, 1989

Related U.S. Application Data

[63] Continuation of Ser. No. 172,594, Mar. 24, 1988, Pat. No. 4,876,347, which is a continuation of Ser. No. 907,216, Sep. 18, 1986, Pat. No. 4,751,309.

[30] Foreign Application Priority Data

Sep. 21, 1985 [DE] Fed. Rep. of Germany ....... 3533772

[51] Int. Cl.$^5$ ................ C07D 241/36; C07D 401/06; C07D 211/70; C07D 211/82; C07D 213/06; C07D 215/12; C07D 487/00
[52] U.S. Cl. .................................. 544/353; 544/32; 544/284; 544/296; 544/316; 544/354; 544/405; 544/357; 544/359; 544/360; 544/361; 546/104; 546/140; 546/141; 546/142; 546/145; 546/148; 546/153; 546/155; 546/176; 546/177; 546/178; 546/180; 546/205; 546/255; 546/264; 546/270; 546/271; 546/272; 546/273; 546/328; 546/350; 546/102; 546/103; 546/104; 546/108; 548/305; 548/156; 548/328
[58] Field of Search ................ 544/353; 548/328, 350

[56] References Cited

U.S. PATENT DOCUMENTS 3,793,034 2/1974 Sato et al. ..................... 548/328 X
4,751,309 6/1988 Daltrozzo et al. .............. 544/353 X Primary Examiner—Floyd D. Higel
Attorney, Agent, or Firm—Oblon, Spivak, McClelland, Maier & Neustadt

[57] ABSTRACT

Methine dyes (I) which conform in one of their tautomeric forms to the general formula

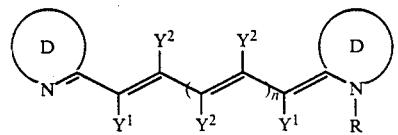

where
$Y^1$ is in both or either case an electron-attracting group and the other $Y^1$ is hydrogen,
$Y^2$ is in each case, independently of the others, hydrogen, —CN, halogen, $C_1$–$C_6$-alkyl, $C_5$–$C_7$-cycloalkyl, phenyl, pyridyl or together with a further $Y^2$ a five- or six-membered ring which may have a fused-on benzene ring,
R is hydrogen, $C_1$–$C_{20}$-alkyl, $C_7$–$C_{10}$-aralkyl or β-hydroxyethyl and
n is 1, 2, 3, 4, 5 or 6 and the groups

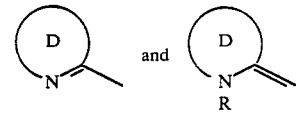

are identical or different five- or six-membered heterocyclic radicals, except 1,2,4-oxadiazol-5-yl, and the radicals D may be substituted and/or fused and can be present in the quaternized (cationic) or deprotonated (anionic) form, the compounds of the formulae

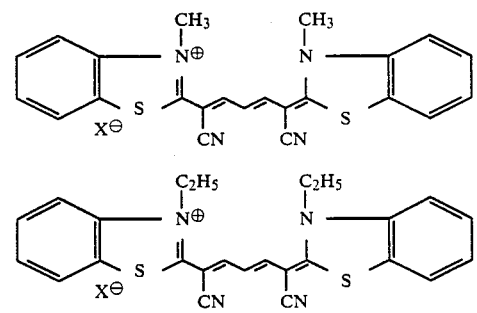

being excepted, have a very high molar absorption within the range from 500 to 1200 nm and are in many cases readily soluble in organic solvents and/or thermoplastics or crosslinked plastics, which is why these dyes are highly suitable for optical recording media; a process for preparing (I); and optical recording media which contain (I).

13 Claims, No Drawings

METHINE DYES WHICH HAVE AT LEAST ONE HETEROCYCLE CONTAINING TWO NITROGEN ATOMS AND PREPARATION THEREOF

This is a continuation application of U.S. Ser. No. 07/172,594, filed Mar. 24, 1988 now U.S. Pat. No. 4,876,347, which is a continuation of U.S. Ser. No. 06/907,216, filed Sept. 15, 1986 now U.S. Pat. No. 4,751,309.

Neutral methine dyes which contain a 1,2,4-oxadiazole nucleus and, on the α-carbon of the methine chain, an electron-attracting radical are known from British Pat. No. 626,470. Symmetrical quaternary pentamethine dyes with N-methyl- and N-ethylbenzothiazole and electron-attracting radicals on the α-carbon are known from German Laid-Open Applications DOS 2,142,967, DOS 2,165,915 and DOS 2,214,055.

The present invention relates to methine dyes which, in one of their tautomeric forms, have the general formula

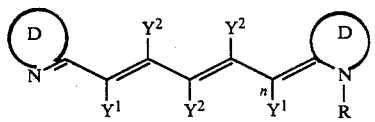

(I)

where
Y$^1$ is in both or either case an electron-attracting group and the other Y$^1$ is hydrogen,
Y$^2$ is in each case, independently of the others, hydrogen, cyano, halogen, $C_1$-$C_6$-alkyl, $C_5$-$C_7$-cycloalkyl, phenyl, pyridyl or together with a further Y$^2$ a five- or six-membered ring which may have a fused-on benzene ring,
R is hydrogen, $C_1$-$C_{20}$-alkyl, $C_7$-$C_{10}$-aralkyl or β-hydroxyethyl and
n is 1, 2, 3, 4, 5 or 6 and the groups

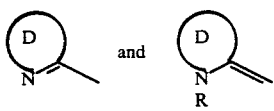

are identical or different five- or six-membered heterocyclic radicals, except 1,2,4-oxadiazol-5-yl, and the radicals D may be substituted and/or fused and can be present in the quaternized (cationic) or deprotonated (anionic) form, the compounds of the formulae

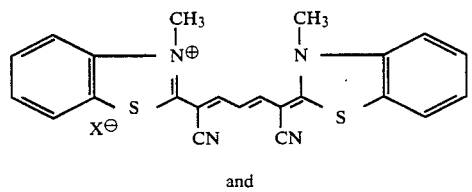

and

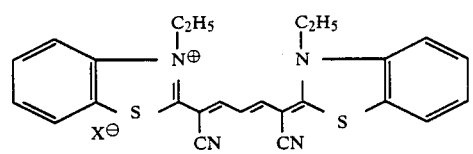

where X$^\ominus$ is one equivalent of an anion, being excepted.

The methine dyes (I) of the invention have a very high molar absorption within the range from 500 to 1200 nm. Many are readily soluble in organic solvents, thermoplastics or crosslinked plastics. Correspondingly the optical recording media obtainable with the methine dyes (I) are of high quality, having for example a high visual contrast, a very high signal-to-noise ratio and a favorable threshold energy.

Suitable electron-attracting groups Y$^1$ are cyano, trifluoromethyl, nitro, carbo-$C_1$-$C_{12}$-alkoxy or phenylsulfonyl which may be monosubstituted or disubstituted by $C_1$-$C_{12}$-alkyl, $C_1$-$C_{12}$-alkoxy, halogen and/or cyano. Y$^1$ is preferably cyano.

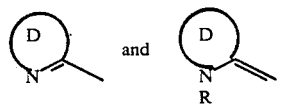

are derived from
1. substituted or unsubstituted 5-membered rings which carry in the α-position relative to the point of attachment an N atom and, if desired, 1 to 2 further hetero atoms—except 1,2,4-oxidiazol-5-yl, and
2. substituted or unsubstituted 6-membered rings which carry in the α-position relative to the point of attachment an N atom and, if desired, 1 or 2 further N atoms, and the 5- and 6-membered heterocyclic rings can be fused to benzene or naphthalene rings.

D is derived for example from
1.1 thiazole, selenazole, oxazole, imidazole, isoxazole, isothiazole, isoselenazole, pyrazole, 1,2,4-thiadiazole, 1,2,4-selenadiazole, 1,2,4-triazole, 1,3,4-oxadiazole, 1,3,4-thiadiazole, 1,2,5-oxadiazole, 1,2,5-thiadiazole, 1,2,3-triazole, 1,2,5-selenadiazole, 1,3,4-selenadiazole;
1.2 benzoxazole, benzothiazole, benzoselenazole, benzimidazole, benzisoxazole, indole, benzisothiazole, benzisoselenazole, benzopyrazole;
1.3 the compounds of 1.1 with a fused-on 1,2- and 2,3-naphthalene system.
2.1 Pyridine, pyrimidine, pyrazine, 1,2,4-triazine, pyridazine;
2.2 quinoline, quinazoline, quinoxaline;
2.3 the compounds of 2.1 with a fused-on 1,2- and 2,3-naphthalene system.
Specific examples of

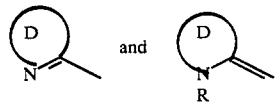

are:

1.1.1

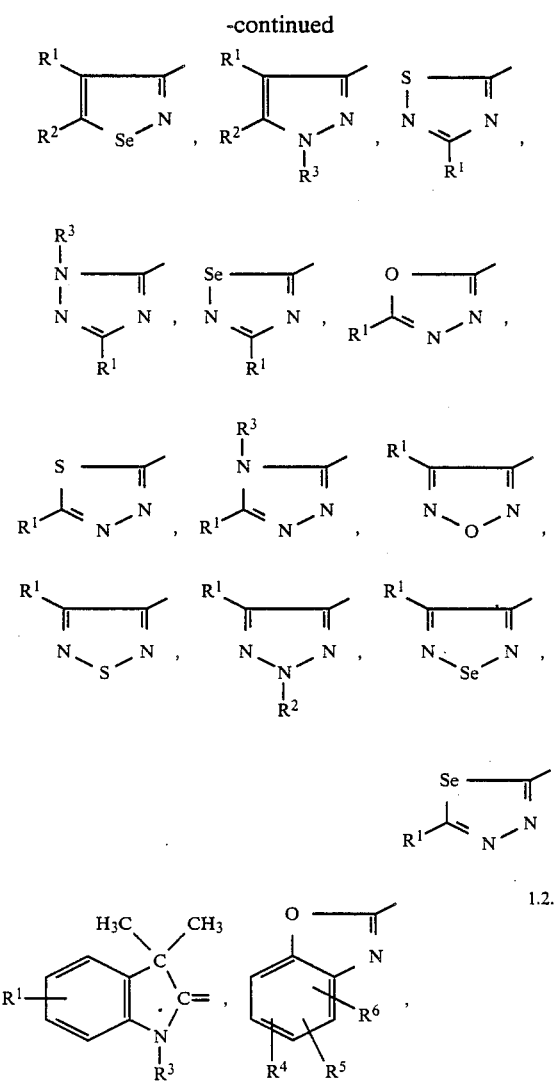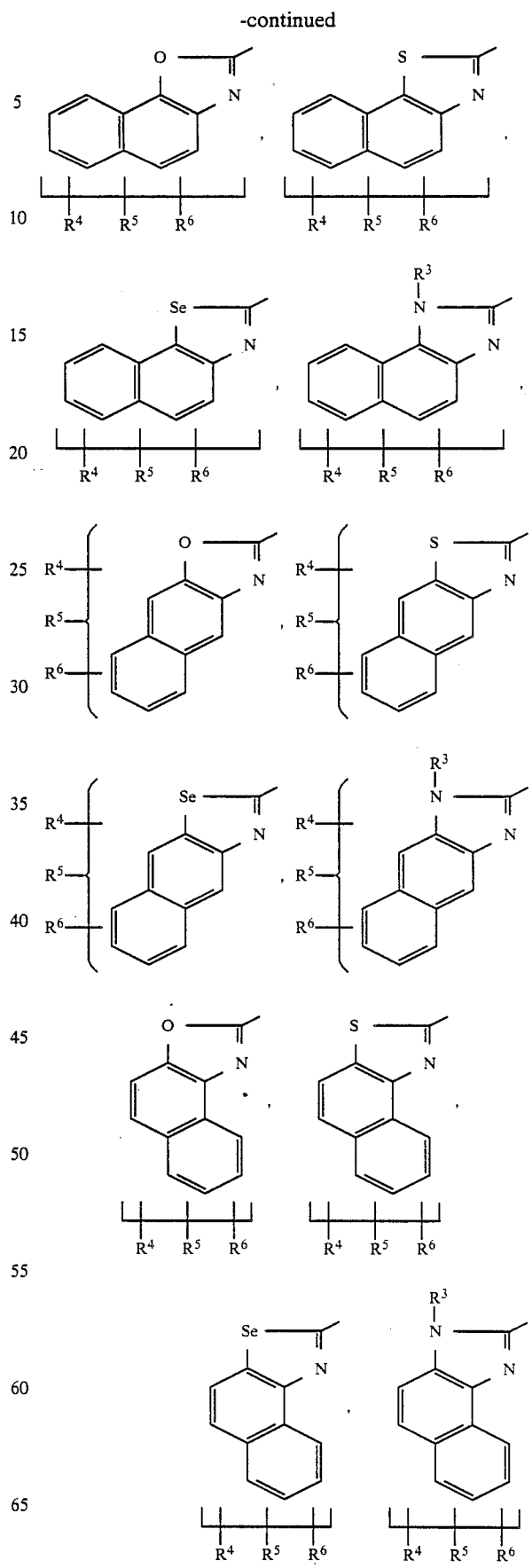

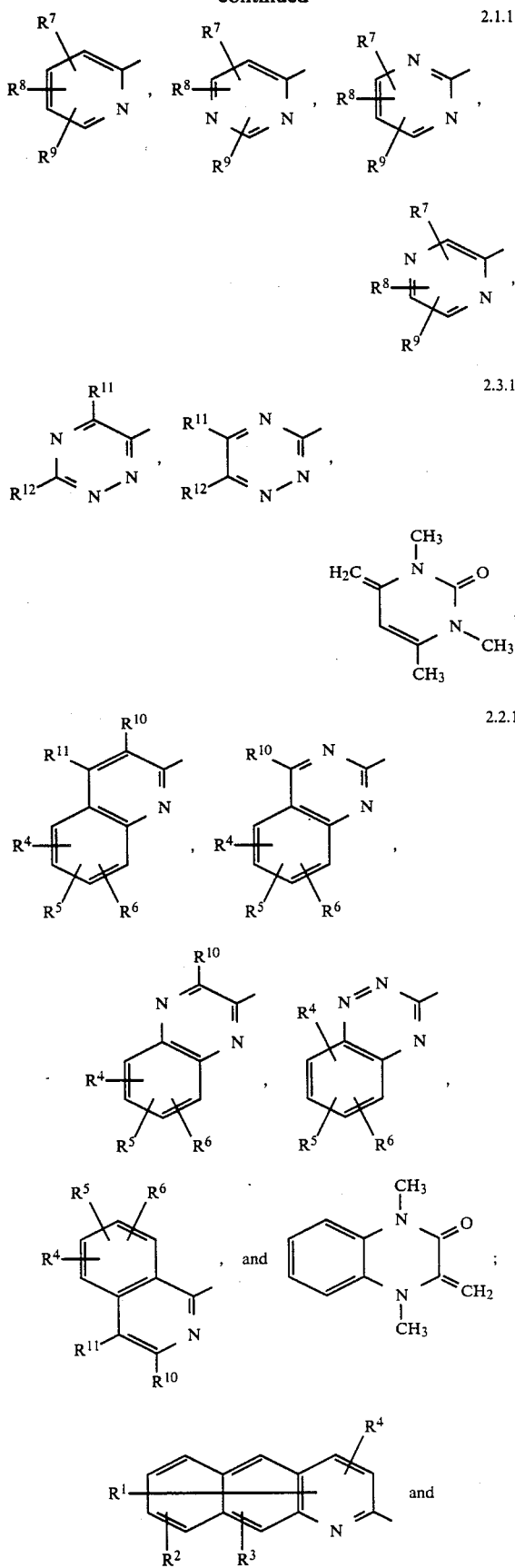

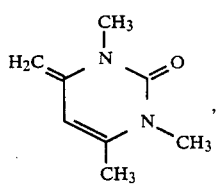

In the above formulae, $R^1$, $R^2$, $R^3$, $R^4$, $R^5$, $R^6$, $R^7$, $R^8$, $R^9$, $R^{10}$, $R^{11}$ and $R^{12}$ are each, independently of one another, hydrogen, halogen, CN, $CF_3$, nitro, $C_1-C_4$-alkyl, $C_1-C_4$-alkoxy or phenyl which may be substituted by halogen, $C_1-C_4$-alkyl, $C_1-C_4$-alkoxy, CN, $CF_3$ and/or $NO_2$, only one nitro group being present per radical D.

Suitable halogen is bromine, fluorine and preferably chlorine.

Specific examples of $C_1-C_4$-alkyl are: methyl, ethyl, n-propyl, iso-propyl, n-butyl, sec.-butyl, isobutyl and tert.-butyl.

Specific examples of $C_1-C_4$-alkoxy are: methoxy, ethoxy, propoxy, isopropoxy, butoxy, 2-butoxy and tert.-butoxy.

The number of substituents on D is, per D, up to 4, preferably 0, 1 or 2, in particular 0 or 1.

Preferred methine dyes (II) are those of the formula $$\text{(II)}$$

where
$Y^3$ is cyano and
$Y^2$ and $Y^4$ are each, independently of one another, hydrogen, chlorine, cyano, phenyl or pyridyl or together a five- or six-membered ring which may have a fused-on benzene nucleus, and n is 1, 2, 3, 4, 5 or 6, and D' is derived from benzothiazole, benzoselenazole, benzoxazole, benzimidazole, pyridine, pyrimidine, pyrazine, pyridazine, quinoline, quinoxaline, indole or quinazoline, the two radicals D' being identical or different, and R has the abovementioned meanings.

Preferred specific examples of D' are:

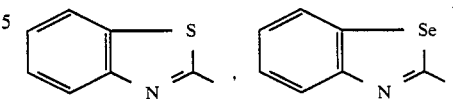

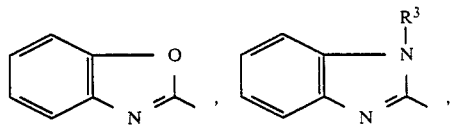

where $R^3$ is $-H$, $-CH_3$, $-C_2H_5$, $\text{-n-}C_4H_9$, $-C_8H_{17}$, $C_{12}H_{25}$, $C_{16}H_{35}$, $-C_{18}H_{37}$ or $-C_{20}H_{41}$;

-continued
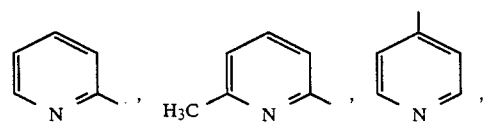,
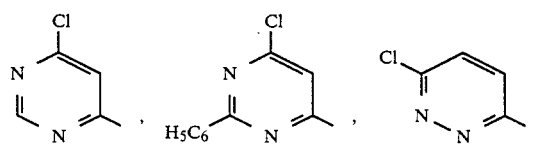,
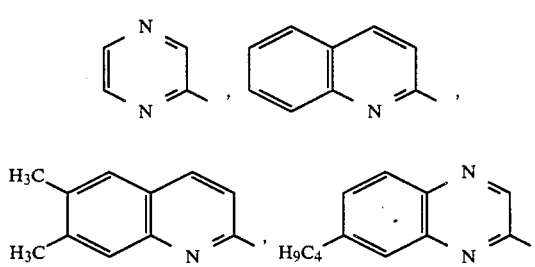,
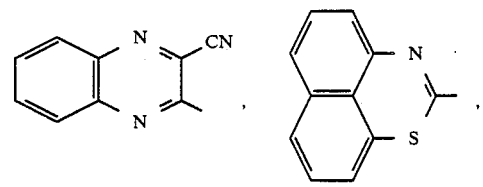,
-continued
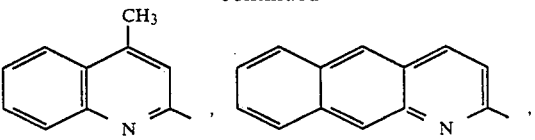,
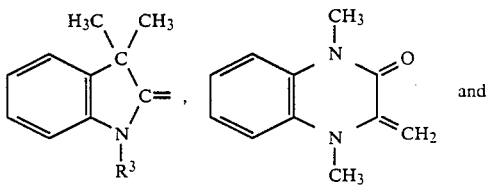 and
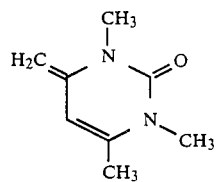.
Particular preference is given to methine dyes of the formula (III)
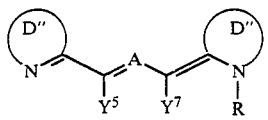 (III)
where D'', A, $Y^5$, $Y^7$ and R have the meanings indicated in Table 1.

TABLE 1

| Dye No. | the one D'' | the other D'' | R | Y⁵ | Y⁷ | [A] | m |
|---|---|---|---|---|---|---|---|
| III.1 | (benzothiazole) | (benzothiazole N-R) | —H | —CN | —CN | (polyene) | m = 1 |
| III.2 | " | " | —C$_2$H$_5$ | " | " | " | m = 1 |
| III.3 | " | " | —n-C$_4$H$_9$ | " | " | " | m = 1 |
| III.4 | " | " | —C$_{12}$H$_{25}$(n) | " | " | " | m = 1 |
| III.5 | " | " | —H | " | " | " | m = 2 |
| III.6 | " | " | —C$_2$H$_5$ | " | " | " | m = 2 |
| III.7 | " | " | —n-C$_4$H$_9$ | " | " | " | m = 2 |
| III.8 | " | " | —C$_{12}$H$_{25}$(n) | " | " | " | m = 2 |
| III.9 | " | " | —H | " | " | " | m = 3 |
| III.10 | " | " | —C$_2$H$_5$ | " | " | " | m = 3 |

TABLE 1-continued

| Dye No. | the one D″ | the other D″ | R | Y⁵ | Y⁷ | [A] |
|---|---|---|---|---|---|---|
| III. 11 | " | " | -n-C₄H₉ | " | " | m = 3 |
| III. 12 | " | " | —C₁₂H₂₅(n) | " | " | m = 3 |
| III. 13 | " | " | —H | " | " | m = 4 |
| III. 14 | " | " | —C₂H₅ | " | " | m = 4 |
| III. 15 | " | " | -n-C₄H₉ | " | " | m = 4 |
| III. 16 | " | " | —C₁₂H₂₅(n) | " | " | m = 4 |
| III. 17 | " | " | —H, R³ = —H | —CN | —CN | m = 1 |
| III. 18 | " | " | —H, R³ = —CH₃ | " | " | m = 1 |
| III. 19 | " | " | —H, R³ = —C₂H₅ | " | " | m = 1 |
| III. 20 | " | " | —H, R³ = —C₁₂H₂₅(n) | " | " | m = 1 |

TABLE 1-continued

| Dye No. | the one D" | the other D" | R | | $Y^5$ | $Y^7$ | [A] | |
|---|---|---|---|---|---|---|---|---|
| III. 21 | " | " | —$C_2H_5$ | $R^3 =$ —H | " | " | | m = 1 |
| III. 22 | " | " | —$C_2H_5$ | $R^3 = CH_3$ | " | " | | m = 1 |
| III. 23 | " | " | —$C_2H_5$ | $R^3 =$ —$C_2H_5$ | " | " | | m = 1 |
| III. 24 | " | " | —$C_2H_5$ | $R^3 =$ —$C_{12}H_{25}(n)$ | " | " | | m = 1 |
| III. 25 | " | " | -n-$C_4H_9$ | $R^3 =$ —H | " | " | | m = 1 |
| III. 26 | " | " | -n-$C_4H_9$ | $R^3 = CH_3$ | " | " | | m = 1 |
| III. 27 | " | " | -n-$C_4H_9$ | $R^3 =$ —$C_2H_5$ | " | " | | m = 1 |
| III. 28 | " | " | —$C_4H_9$ | $R^3 = C_{12}H_{25}(n)$ | " | " | | m = 2 |
| III. 29 | " | " | —H | $R^3 =$ —H | " | " | | m = 2 |
| III. 30 | " | " | —H | $R^3 =$ —$CH_3$ | " | " | | m = 2 |
| III. 31 | " | " | —H | $R^3 =$ —$C_2H_5$ | " | " | | m = 2 |

TABLE 1-continued

| Dye No. | the one D'' | the other D'' | R | | $Y^5$ $Y^7$ | [A] |
|---|---|---|---|---|---|---|
| III. 32 | ![structure] | ![structure] | —H | $R^3$ = —C$_{12}$H$_{25}$(n) | " " | m = 2 |
| III. 33 | " | " | —C$_2$H$_5$ | $R^3$ = —H | —CN  —CN | m = 2 |
| III. 34 | " | " | —C$_2$H$_5$ | $R^3$ = —CH$_3$ | " | m = 2 |
| III. 35 | " | " | —C$_2$H$_5$ | $R^3$ = —C$_2$H$_5$ | " | m = 2 |
| III. 36 | " | " | —C$_2$H$_5$ | $R^3$ = —C$_{12}$H$_{25}$(n) | " | m = 2 |
| III. 37 | " | " | -n-C$_4$H$_9$ | $R^3$ = —H | " | m = 2 |
| III. 38 | " | " | -n-C$_4$H$_9$ | $R^3$ = —CH$_3$ | " | m = 2 |
| III. 39 | " | " | -n-C$_4$H$_9$ | $R^3$ = —C$_2$H$_5$ | " | m = 2 |
| III. 40 | " | " | -n-C$_4$H$_9$ | $R^3$ = —C$_{12}$H$_{25}$(n) | " | m = 2 |
| III. 41 | " | " | —H | $R^3$ = —H | " | m = 3 |

TABLE 1-continued

| Dye No. | the one D'' | the other D'' | R | | $Y^5$ | $Y^7$ | [A] |
|---|---|---|---|---|---|---|---|
| III. 42 | (structure shown) | (structure shown) | —H | $R^3 =$ —CH$_3$ | " | " | $m = 3$ |
| III. 43 | " | " | —H | $R^3 =$ —C$_2$H$_5$ | " | " | $m = 3$ |
| III. 44 | " | " | —H | $R^3 =$ —C$_{12}$H$_{25}$(n) | " | " | $m = 3$ |
| III. 45 | " | " | —C$_2$H$_5$ | $R^3 =$ —H | " | " | $m = 3$ |
| III. 46 | " | " | —C$_2$H$_5$ | $R^3 =$ —CH$_3$ | " | " | $m = 3$ |
| III. 47 | " | " | —C$_2$H$_5$ | $R^3 =$ —C$_2$H$_5$ | " | " | $m = 3$ |
| III. 48 | " | " | —C$_2$H$_5$ | $R^3 =$ —C$_{12}$H$_{25}$(n) | " | " | $m = 3$ |
| III. 49 | " | " | -n-C$_4$H$_9$ | $R^3 =$ —H | " | " | $m = 3$ |
| III. 50 | " | " | -n-C$_4$H$_9$ | $R^3 =$ —CH$_3$ | —CN | —CN | $m = 3$ |
| III. 51 | " | " | -n-C$_4$H$_9$ | $R^3 =$ —C$_2$H$_5$ | " | " | $m = 3$ |

TABLE 1-continued

| Dye No. | the one D'' | the other D'' | R | R³ | Y⁵ | Y⁷ | [A] |
|---|---|---|---|---|---|---|---|
| III. 52 | " | " | -n-C₄H₉ | R³ = —C₁₂H₂₅(n) | " | " | m = 3 |
| III. 53 | " | " | —H | R³ = —H | " | " | m = 4 |
| III. 54 | " | " | —H | R³ = —CH₃ | " | " | m = 4 |
| III. 55 | " | " | —H | R³ = —C₂H₅ | " | " | m = 4 |
| III. 56 | " | " | —H | R³ = —C₁₂H₂₅(n) | " | " | m = 4 |
| III. 57 | " | " | —C₂H₅ | R³ = —H | " | " | m = 4 |
| III. 58 | " | " | —C₂H₅ | R³ = —CH₃ | " | " | m = 4 |
| III. 59 | " | " | —C₂H₅ | R³ = —C₂H₅ | " | " | m = 4 |
| III. 60 | " | " | —C₂H₅ | R³ = —C₁₂H₂₅(n) | " | " | m = 4 |
| III. 61 | " | " | -n-C₄H₉ | R³ = —H | " | " | m = 4 |
| III. 62 | " | " | -n-C₄H₉ | R³ = —CH₃ | " | " | m = 4 |

TABLE 1-continued

| Dye No. | the one D" | the other D" | R | | $Y^5$ | $Y^7$ | [A] |
|---|---|---|---|---|---|---|---|
| III. 63 | " | " | -n-$C_4H_9$ | $R^3 = -C_2H_5$ | " | " | m = 4 |
| III. 64 | " | " | -$C_4H_9$ | $R^3 = -C_{12}H_{25}$(n) | " | " | m = 4 |
| III. 65 | ![pyridine with R7] | ![pyridine with R8 and N-R] | -H | $R^7 = -H$, $R^8 = -H$ | -CN | -CN | m = 1 |
| III. 66 | " | " | -H | $R^7 = -H$, $R^8 = -CH_3$ | " | " | m = 1 |
| III. 67 | " | " | -H | $R^7 = -CH_3$, $R^8 = -CH_3$ | " | " | m = 2 |
| III. 68 | " | " | -H | $R^7 = -H$, $R^8 = -CH_3$ | " | " | m = 2 |
| III. 69 | " | " | -H | $R^7 = -H$, $R^8 = -H$ | " | " | m = 2 |
| III. 70 | " | " | -H | $R^7 = -H$, $R^8 = -CH_3$ | " | " | m = 2 |
| III. 71 | " | " | -H | $R^7 = -CH_3$, $R^8 = -H$ | " | " | m = 3 |
| III. 72 | " | " | -H | $R^7 = -H$, $R^8 = -CH_3$ | " | " | m = 3 |

TABLE 1-continued

| Dye No. | the one D'' | the other D'' | R | | $Y^5$ $Y^7$ | [A] |
|---|---|---|---|---|---|---|
| III. 73 | " | " | —H | $R^7$ = —CH$_3$ $R^8$ = —H | " | m = 3 |
| III. 74 | " | " | —H | $R^7$ = —H $R^8$ = —H | " | m = 4 |
| III. 75 | " | " | —H | $R^7$ = —H $R^8$ = —CH$_3$ | " | m = 4 |
| III. 76 | " | " | —H | $R^7$ = —CH$_3$ $R^8$ = —H | " | m = 4 |
| III. 77 | (pyridine) | (N-R pyridine) | —H | | —CN  —CN | m = 1 |
| III. 78 | " | " | —C$_2$H$_5$ | | " | m = 1 |
| III. 79 | " | " | —H | | " | m = 1 |
| III. 80 | " | " | —C$_2$H$_5$ | | " | m = 1 |
| III. 81 | " | " | —H | | " | m = 2 |
| III. 82 | " | " | —C$_2$H$_5$ | | " | m = 3 |

TABLE 1-continued

| Dye No. | the one D″ | the other D″ | R | | $Y^5$ $Y^7$ | [A] |
|---|---|---|---|---|---|---|
| III. 83 | | ″ | —H | | | m = 4 |
| III. 84 | | ″ | —C$_2$H$_5$ | | | m = 4 |
| III. 85 | | | —H | $R^7$ = —H, $R^8$ = —H | —CN  —CN | |
| III. 86 | ″ | ″ | —H | $R^7$ = —H, $R^8$ = —CH$_3$ | ″ | ″ |
| III. 87 | ″ | ″ | —H | $R^7$ = —CH$_3$, $R^8$ = —CH$_3$ | ″ | ″ |
| III. 88 | | | —H | $R^4$ = —H | —CN  —CN | |
| III. 89 | ″ | ″ | —CH$_3$ | $R^4$ = —H | ″ | m = 1 |
| III. 90 | ″ | ″ | —C$_2$H$_5$ | $R^4$ = —H | ″ | m = 1 |
| III. 91 | ″ | ″ | —C$_2$H$_4$OH | $R^4$ = —H | ″ | m = 1 |
| III. 92 | ″ | ″ | —C$_{12}$H$_{25}$(n) | $R^4$ = —H | ″ | m = 1 |

TABLE 1-continued

| Dye No. | the one D″ | the other D″ | R | R⁴ | $Y^5$ | $Y^7$ | [A] |
|---|---|---|---|---|---|---|---|
| III.93 | (quinoline structure) | (quinoline structure with R⁴) | —H | $R^4$ = —CH$_3$ | " | " | m = 1 |
| III.94 | " | " | —CH$_3$ | $R^4$ = —CH$_3$ | " | " | m = 1 |
| III.95 | " | " | —C$_2$H$_5$ | $R^4$ = —CH$_3$ | " | " | m = 1 |
| III.96 | " | " | —C$_2$H$_4$OH | $R^4$ = —CH$_3$ | " | " | m = 1 |
| III.97 | " | " | —C$_{12}$H$_{25}$(n) | $R^4$ = —CH$_3$ | " | " | m = 1 |
| III.98 | " | " | —H | $R^4$ = —H | —CN | —CN | m = 1 |
| III.99 | " | " | —CH$_3$ | $R^4$ = —H | " | " | m = 2 |
| III.100 | " | " | —C$_2$H$_5$ | $R^4$ = —H | " | " | m = 2 |
| III.101 | " | " | —C$_2$H$_4$OH | $R^4$ = —H | " | " | m = 2 |
| III.102 | " | " | —C$_{12}$H$_{25}$(n) | $R^4$ = —H | " | " | m = 2 |

TABLE 1-continued

| Dye No. | the one D'' | the other D'' | R | | $Y^5$ | $Y^7$ | [A] | |
|---|---|---|---|---|---|---|---|---|
| III. 103 | | | —H | $R^4$ = —CH$_3$ | —CN | —CN | | m = 2 |
| III. 104 | ″ | ″ | —CH$_3$ | $R^4$ = —CH$_3$ | ″ | ″ | | m = 2 |
| III. 105 | ″ | ″ | —C$_2$H$_5$ | $R^4$ = —CH$_3$ | ″ | ″ | | m = 2 |
| III. 106 | ″ | ″ | —C$_2$H$_4$OH | $R^4$ = —CH$_3$ | ″ | ″ | | m = 2 |
| III. 107 | ″ | ″ | —C$_{12}$H$_{25}$(n) | $R^4$ = —CH$_3$ | ″ | ″ | | m = 2 |
| III. 108 | ″ | ″ | —H | $R^4$ = —H | ″ | ″ | | m = 3 |
| III. 109 | ″ | ″ | —CH$_3$ | $R^4$ = —H | ″ | ″ | | m = 3 |
| III. 110 | ″ | ″ | —C$_2$H$_5$ | $R^4$ = —H | ″ | ″ | | m = 3 |
| III. 111 | ″ | ″ | —C$_2$H$_4$OH | $R^4$ = —H | ″ | ″ | | m = 3 |
| III. 112 | ″ | ″ | —C$_{12}$H$_{25}$(n) | $R^4$ = —H | ″ | ″ | | m = 3 |

TABLE 1-continued

| Dye No. | the one D" | the other D" | R | R⁴ | Y⁵ Y⁷ | [A] |
|---|---|---|---|---|---|---|
| III.113 | " | " | —H | R⁴ = —CH₃ | " | m = 3 |
| III.114 | " | " | —CH₃ | R⁴ = —CH₃ | " | m = 3 |
| III.115 | " | " | —C₂H₅ | R⁴ = —CH₃ | " | m = 3 |
| III.116 | " | " | —C₂H₄OH | R⁴ = —CH₃ | " | m = 3 |
| III.117 | " | " | —C₁₂H₂₅(n) | R⁴ = —CH₃ | " | m = 3 |
| III.118 | " | " | —H | R⁴ = —H | —CN —CN | m = 4 |
| III.119 | " | " | —CH₃ | R⁴ = —H | " | m = 4 |
| III.120 | " | " | —C₂H₅ | R⁴ = —H | " | m = 4 |
| III.121 | " | " | —C₂H₄OH | R⁴ = —H | " | m = 4 |
| III.122 | " | " | —C₁₂H₂₅(n) | R⁴ = —H | " | m = 4 |

TABLE 1-continued

| Dye No. | the one D'' | the other D'' | R | R⁴ | Y⁵ | Y⁷ | [A] |
|---|---|---|---|---|---|---|---|
| III. 123 | (quinoline structure with R⁴) | (quinoline structure with N—R) | —H | R⁴ = —CH₃ | " | " | (polyene, m = 4) |
| III. 124 | " | " | —CH₃ | R⁴ = —CH₃ | " | " | (polyene, m = 4) |
| III. 125 | " | " | —C₂H₅ | R⁴ = —CH₃ | " | " | (polyene, m = 4) |
| III. 126 | " | " | —C₂H₄OH | R⁴ = —CH₃ | " | " | (polyene, m = 4) |
| III. 127 | " | " | —C₁₂H₂₅(n) | R⁴ = —CH₃ | " | " | (polyene, m = 4) |
| III. 128 | " | " | —H | R⁴ = —H | " | " | (polyene with CN) |
| III. 129 | " | " | —H | R⁴ = —CH₃ | " | " | " |
| III. 130 | " | " | —CH₃ | R⁴ = —H | " | " | " |
| III. 131 | " | " | —CH₃ | R⁴ = —CH₃ | " | " | " |
| III. 132 | " | " | —C₂H₅ | R⁴ = —H | " | " | " |
| III. 133 | " | " | —C₂H₅ | R⁴ = —CH₃ | " | " | " |
| III. 134 | " | " | —C₂H₄OH | R⁴ = —H | " | " | " |

TABLE 1-continued

| Dye No. | the one D' | the other D'' | R | | $Y^5$ | $Y^7$ | [A] |
|---|---|---|---|---|---|---|---|
| III. 135 | (quinoline structure with R⁴) | (quinoline structure with N—R) | —H | $R^4$ = —CH$_3$ | —CN | —CN | (hexadienyl-CN group) |
| III. 136 | " | " | —C$_{12}$H$_{25}$(n) | $R^4$ = —H | " | " | " |
| III. 137 | " | " | —C$_{12}$H$_{25}$(n) | $R^4$ = —CH$_3$ | " | " | " |
| III. 138 | (pyrazine with R⁵, R¹⁰) | (pyrazine with R⁴, R⁵, N—R) | —H | $R^4$ = —H, $R^{10}$ = —H | " | " | m = 1 |
| III. 139 | " | " | —H | $R^4$ = —CH$_3$, $R^{10}$ = —CH$_3$ | " | " | m = 1 |
| III. 140 | " | " | —H | $R^4$ = —H, $R^{10}$ = —CH$_3$ | " | " | m = 1 |
| III. 141 | " | " | —H | $R^4$ = —CH$_3$, $R^{10}$ = —CN | " | " | m = 1 |
| III. 142 | " | " | —H | $R^4$ = —H, $R^{10}$ = —H | " | " | m = 2 |
| III. 143 | " | " | —H | $R^4$ = —CH$_3$, $R^{10}$ = —CH$_3$ | " | " | m = 2 |

TABLE 1

| Dye No. | the one D'' | the other D'' | R | | $Y^5$ | $Y^7$ | [A] |
|---|---|---|---|---|---|---|---|
| III. 144 | | | —H | $R^4$ = —H<br>$R^5$ = —H<br>$R^{10}$ = —CN | —CN | —CN | m = 2 |
| III. 145 | " | " | —H | $R^4$ = —CH$_3$<br>$R^5$ = —CH$_3$<br>$R^{10}$ = —CN | " | " | m = 2 |
| III. 146 | " | " | —H | $R^4$ = —H<br>$R^5$ = —H<br>$R^{10}$ = —H | —CN | —CN | m = 3 |
| III. 147 | " | " | —H | $R^4$ = —CH$_3$<br>$R^5$ = —CH$_3$<br>$R^{10}$ = —H | " | " | m = 3 |
| III. 148 | " | " | —H | $R^4$ = —H<br>$R^5$ = —H<br>$R^{10}$ = —H | " | " | m = 3 |
| III. 149 | " | " | —H | $R^4$ = —CH$_3$<br>$R^5$ = —CH$_3$<br>$R^{10}$ = —CN | " | " | m = 3 |
| III. 150 | " | " | —H | $R^4$ = —H<br>$R^5$ = —H<br>$R^{10}$ = —CN | " | " | m = 4 |
| III. 151 | " | " | —H | $R^4$ = —CH$_3$<br>$R^5$ = —CH$_3$<br>$R^{10}$ = —CH$_3$ | " | " | m = 4 |
| III. 152 | " | " | —H | $R^4$ = —H<br>$R^5$ = —H<br>$R^{10}$ = —H | " | " | m = 4 |
| III. 153 | " | " | —H | $R^4$ = —CH$_3$<br>$R^5$ = —CH$_3$<br>$R^{10}$ = —CN | " | " | m = 3 |

TABLE 1-continued

| Dye No. | the one D'' | the other D'' | R | | $Y^5$ $Y^7$ | [A] |
|---|---|---|---|---|---|---|
| III. 154 | quinoline with $R^4$ | quinoline N-R | —H | $R^4$ = —H | —CN —CN | hexatrienyl-CN structure |
| III. 155 | " | " | —H | $R^4$ = —CH$_3$ | " | " |
| III. 156 | " | " | —CH$_3$ | $R^4$ = —H | " | " |
| III. 157 | " | " | —CH$_3$ | $R^4$ = —CH$_3$ | " | " |
| III. 158 | " | " | —C$_2$H$_5$ | $R^4$ = —H | " | " |
| III. 159 | " | " | —C$_2$H$_5$ | $R^4$ = —CH$_3$ | " | " |
| III. 160 | quinoline variant | benzothiazole N-R | —H | $R^4$ = —H | " | $m = 1$ |
| III. 161 | " | " | —H | $R^4$ = —CH$_3$ | " | $m = 1$ |
| III. 162 | " | " | —C$_2$H$_5$ | $R^4$ = —H | " | $m = 1$ |
| III. 163 | " | " | —C$_2$H$_5$ | $R^4$ = —CH$_3$ | " | $m = 1$ |
| III. 164 | " | " | —n-C$_4$H$_9$ | $R^4$ = —H | " | $m = 1$ |
| III. 165 | " | " | —C$_4$H$_9$ | $R^4$ = —CH$_3$ | " | $m = 1$ |

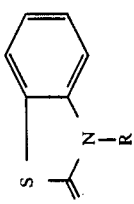

TABLE 1-continued

| Dye No. | the one D'' | the other D'' | R | | $Y^5$ | $Y^7$ | [A] |
|---|---|---|---|---|---|---|---|
| III. 176 | " | " | —H | $R^4$ = —H | " | " | m = 3 |
| III. 177 | " | " | —H | $R^4$ = —CH$_3$ | " | " | m = 3 |
| III. 178 | " | " | —C$_2$H$_5$ | $R^4$ = —H | " | " | m = 3 |
| III. 179 | " | " | —CH$_2$H$_5$ | $R^4$ = —CH$_3$ | " | " | m = 3 |
| III. 180 | " | " | -n-C$_4$H$_9$ | $R^4$ = —H | " | " | m = 3 |
| III. 181 | " | " | —C$_4$H$_9$ | $R^4$ = —CH$_3$ | " | " | m = 3 |
| III. 182 | " | " | —C$_{12}$H$_{25}$(n) | $R^4$ = —H | " | " | m = 3 |
| III. 183 | " | " | —C$_{12}$H$_{25}$(n) | $R^4$ = —CH$_3$ | " | " | m = 3 |
| III. 184 | " | " | —H | $R^4$ = AB,4 H | —CN | —CN | m = 4 |
| III. 185 | " | " | —H | $R^4$ = AB,4 CH$_3$ | " | " | m = 4 |

TABLE 1-continued
| Dye No. | the one D'' | the other D'' | R | | $Y^5$ | $Y^7$ | [A] |
|---|---|---|---|---|---|---|---|
| III. 186 |  |  | —C$_2$H$_5$ | R$^4$ = AB,4 H | " | " | m = 4 |
| III. 187 | " | " | —C$_2$H$_5$ | R$^4$ = AB,4 CH$_3$ | " | " | m = 4 |
| III. 188 | " | " | -n-C$_4$H$_9$ | R$^4$ = AB,4 H | " | " | m = 4 |
| III. 189 | " | " | —C$_4$H$_9$ | R$^4$ = AB,4 CH$_3$ | " | " | m = 4 |
| III. 190 | " | " | —C$_{12}$H$_{25}$(n) | R$^4$ = AB,4 H | " | " | m = 4 |
| III. 191 | " | " | —C$_{12}$H$_{25}$(n) | R$^4$ = AB,4 CH$_3$ | " | " | m = 4 |
| III. 192 | " | " | —H | R$^3$ = —H, R$^4$ = —H | " | " | m = 1 |
| III. 193 | " | " | —H | R$^3$ = —H, R$^4$ = —CH$_3$ | " | " | m = 1 |
| III. 194 | " | " | —H | R$^3$ = —CH$_3$, R$^4$ = —H | " | " | m = 1 |
| III. 195 | " | " | —H | R$^3$ = —CH$_3$, R$^4$ = —CH$_3$ | " | " | m = 1 |

TABLE 1-continued

| Dye No. | the one D'' | the other D'' | R | | Y⁵ Y⁷ | [A] |
|---|---|---|---|---|---|---|
| III. 196 |  | 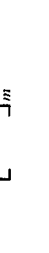 | —H | R³ = —C₂H₅<br>R⁴ = —H | " " | 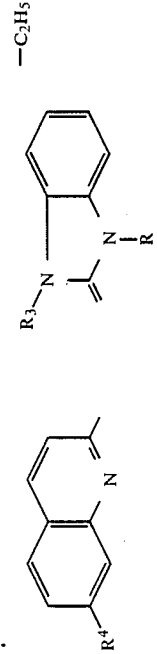 m = 1 |
| III. 197 | " | " | —H | R³ = —C₂H₅<br>R⁴ = —CH₃ | " " | m = 1 |
| III. 198 | " | " | —C₂H₅ | R³ = —H<br>R⁴ = —H | —CN —CN | m = 1 |
| III. 199 | " | " | —C₂H₅ | R³ = —H<br>R⁴ = —CH₃ | " " | m = 1 |
| III. 200 | " | " | —C₂H₅ | R³ = —CH₃<br>R⁴ = —H | " " | m = 1 |
| III. 201 | " | " | —C₂H₅ | R³ = —CH₃<br>R⁴ = —CH₃ | " " | m = 1 |
| III. 202 | " | " | —C₂H₅ | R³ = —C₂H₅<br>R⁴ = —H | " " | m = 1 |
| III. 203 | " | " | —C₂H₅ | R³ = —C₂H₅<br>R⁴ = —CH₃ | " " | m = 1 |
| III. 204 | " | " | -n-C₄H₉ | R³ = —H<br>R⁴ = —H | " " | m = 1 |
| III. 205 | " | " | -n-C₄H₉ | R³ = —H<br>R⁴ = —CH₃ | " " | m = 1 |

TABLE 1-continued

| Dye No. | the one D″ | the other D″ | R | R³, R⁴ | Y⁵ | Y⁷ | [A] |
|---|---|---|---|---|---|---|---|
| III.206 | (quinoline) | (aniline amidine) | -n-C₄H₉ | R³ = —CH₃, R⁴ = —H | " | " | $m=1$ |
| III.207 | " | " | -n-C₄H₉ | R³ = —CH₃, R⁴ = —CH₃ | " | " | $m=1$ |
| III.208 | " | " | -n-C₄H₉ | R³ = —C₂H₅, R⁴ = —H | " | " | $m=1$ |
| III.209 | " | " | -n-C₄H₉ | R³ = —C₂H₅, R⁴ = —CH₃ | " | " | $m=1$ |
| III.210 | " | " | —C₈H₁₇(n) | R³ = —H, R⁴ = —H | —CN | —CN | $m=1$ |
| III.211 | " | " | —C₈H₁₇(n) | R³ = —H, R⁴ = —CH₃ | " | " | $m=1$ |
| III.212 | " | " | —C₈H₁₇(n) | R³ = —CH₃, R⁴ = —H | " | " | $m=1$ |
| III.213 | " | " | —C₈H₁₇(n) | R³ = —CH₃, R⁴ = —CH₃ | " | " | $m=1$ |
| III.214 | " | " | —C₈H₁₇(n) | R³ = —C₂H₅, R⁴ = —H | " | " | $m=1$ |
| III.215 | " | " | —C₈H₁₇(n) | R³ = —C₂H₅, R⁴ = —CH₃ | " | " | $m=1$ |

TABLE 1-continued

| Dye No. | the one D" | the other D" | R | $R^3, R^4$ | $Y^5, Y^7$ | [A] |
|---|---|---|---|---|---|---|
| III. 216 | (quinoline) | (benzimidazole with $R^3$, R) | —H | $R^3$ = —H, $R^4$ = —H | " " | m = 2 |
| III. 217 | " | " | —H | $R^3$ = —H, $R^4$ = —CH$_3$ | " " | m = 2 |
| III. 218 | " | " | —H | $R^3$ = —CH$_3$, $R^4$ = —H | " " | m = 2 |
| III. 219 | " | " | —H | $R^3$ = —CH$_3$, $R^4$ = —CH$_3$ | " " | m = 2 |
| III. 220 | " | " | —H | $R^3$ = —C$_2$H$_5$, $R^4$ = —H | " " | m = 2 |
| III. 221 | " | " | —H | $R^3$ = —C$_2$H$_5$, $R^4$ = —CH$_3$ | " " | m = 2 |
| III. 222 | " | " | —C$_2$H$_5$ | $R^3$ = —H, $R^4$ = —H | —CN, —CN | m = 2 |
| III. 223 | " | " | —C$_2$H$_5$ | $R^3$ = —H, $R^4$ = —CH$_3$ | " " | m = 2 |
| III. 224 | " | " | —C$_2$H$_5$ | $R^3$ = —CH$_3$, $R^4$ = —H | " " | m = 2 |
| III. 225 | " | " | —C$_2$H$_5$ | $R^3$ = —CH$_3$, $R^4$ = —CH$_3$ | " " | m = 2 |

TABLE 1-continued

| Dye No. | the one D'' | the other D'' | R | | Y⁵ | Y⁷ | [A] |
|---|---|---|---|---|---|---|---|
| III. 226 | (quinoline structure with R⁴) | (benzene with R³-N, N-R structure) | —C₂H₅ | R³ = —C₂H₅<br>R⁴ = —H | " | " | (polyene) m = 2 |
| III. 227 | " | " | —C₂H₅ | R³ = —C₂H₅<br>R⁴ = —CH₃ | " | " | m = 2 |
| III. 228 | " | " | —n-C₄H₉ | R³ = —H<br>R⁴ = —H | " | " | m = 2 |
| III. 229 | " | " | —n-C₄H₉ | R³ = —H<br>R⁴ = —CH₃ | " | " | m = 2 |
| III. 230 | " | " | —n-C₄H₉ | R³ = —CH₃<br>R⁴ = —H | " | " | m = 2 |
| III. 231 | " | " | —n-C₄H₉ | R³ = —CH₃<br>R⁴ = —CH₃ | " | " | m = 2 |
| III. 232 | " | " | —n-C₄H₉ | R³ = —C₂H₅<br>R⁴ = —H | " | " | m = 2 |
| III. 233 | " | " | —C₈H₁₇ | R³ = —H<br>R⁴ = —H | " | " | m = 2 |
| III. 234 | " | " | —C₈H₁₇(n) | R³ = —H<br>R⁴ = —H | —CN | —CN | m = 2 |
| III. 235 | " | " | —C₈H₁₇(n) | R³ = —H<br>R⁴ = —CH₃ | " | " | m = 2 |

TABLE 1-continued

| Dye No. | the one D'' | the other D'' | R | | $Y^5$ | $Y^7$ | [A] |
|---|---|---|---|---|---|---|---|
| III. 236 | " | " | $-C_8H_{17}(n)$ | $R^3 = -CH_3$ $R^4 = -H$ | " | " | $m = 2$ |
| III. 237 | " | " | $-C_8H_{17}(n)$ | $R^3 = -CH_3$ $R^4 = -CH_3$ | " | " | $m = 2$ |
| III. 238 | " | " | $-C_8H_{17}(n)$ | $R^3 = -C_2H_5$ $R^4 = -H$ | " | " | $m = 2$ |
| III. 239 | " | " | $-C_8H_{17}(n)$ | $R^3 = -C_2H_5$ $R^4 = -CH_3$ | " | " | $m = 2$ |
| III. 240 | " | " | $-H$ | $R^3 = -H$ $R^4 = -H$ | " | " | $m = 3$ |
| III. 241 | " | " | $-H$ | $R^3 = -H$ $R^4 = -H$ | " | " | $m = 3$ |
| III. 242 | " | " | $-H$ | $R^3 = -CH_3$ $R^4 = -H$ | " | " | $m = 3$ |
| III. 243 | " | " | $-H$ | $R^3 = -CH_3$ $R^4 = -CH_3$ | " | " | $m = 3$ |
| III. 244 | " | " | $-H$ | $R^3 = -C_2H_5$ $R^4 = -H$ | " | " | $m = 3$ |
| III. 245 | " | " | $-H$ | $R^3 = -C_2H_5$ $R^4 = -CH_3$ | " | " | $m = 3$ |

TABLE 1-continued

| Dye No. | the one D'' | the other D'' | R | | Y⁵ | Y⁷ | [A] |
|---|---|---|---|---|---|---|---|
| III. 246 | (2-methylquinoline) | (phenyl-N=C(NR₃)-N-R) | —C₂H₅ | R³ = —H, R⁴ = —H | —CN | —CN | (polyene chain) m = 3 |
| III. 247 | " | " | —C₂H₅ | R³ = —H, R⁴ = —CH₃ | " | " | m = 3 |
| III. 248 | " | " | —C₂H₅ | R³ = —CH₃, R⁴ = —H | " | " | m = 3 |
| III. 249 | " | " | —C₂H₅ | R³ = —CH₃, R⁴ = —CH₃ | " | " | m = 3 |
| III. 250 | " | " | —C₂H₅ | R³ = —C₂H₅, R⁴ = —H | " | " | m = 3 |
| III. 251 | " | " | —C₂H₅ | R³ = —C₂H₅, R⁴ = —CH₃ | " | " | m = 3 |
| III. 252 | " | " | -n-C₄H₉ | R³ = —H, R⁴ = —H | " | " | m = 3 |
| III. 253 | " | " | -n-C₄H₉ | R³ = —H, R⁴ = —CH₃ | " | " | m = 3 |
| III. 254 | " | " | -n-C₄H₉ | R³ = —CH₃, R⁴ = —H | " | " | m = 3 |
| III. 255 | " | " | -n-C₄H₉ | R³ = —CH₃, R⁴ = —CH₃ | " | " | m = 3 |

TABLE 1-continued

| Dye No. | the one D'' | the other D'' | R | | Y⁵ Y⁷ | [A] |
|---|---|---|---|---|---|---|
| III. 256 | (quinoline) | (benzimidazole) | -n-C₄H₉ | R³ = —C₂H₅<br>R⁴ = —H | " " | m = 3 |
| III. 257 | " | " | -n-C₄H₉ | R³ = —C₂H₅<br>R⁴ = —CH₃ | " " | m = 3 |
| III. 258 | " | " | —C₈H₁₇(n) | R³ = —H<br>R⁴ = —H | —CN —CN | m = 3 |
| III. 259 | " | " | —C₈H₁₇(n) | R³ = —H<br>R⁴ = —CH₃ | " " | m = 3 |
| III. 260 | " | " | —C₈H₁₇(n) | R³ = —CH₃<br>R⁴ = —H | " " | m = 3 |
| III. 261 | " | " | —C₈H₁₇(n) | R³ = —CH₃<br>R⁴ = —CH₃ | " " | m = 3 |
| III. 262 | " | " | —C₈H₁₇(n) | R³ = —C₂H₅<br>R⁴ = —H | " " | m = 3 |
| III. 263 | " | " | —C₈H₁₇(n) | R³ = —C₂H₅<br>R⁴ = —CH₃ | " " | m = 3 |
| III. 264 | " | " | —H | R³ = —H<br>R⁴ = —H | " " | m = 4 |
| III. 265 | " | " | —H | R³ = —H<br>R⁴ = —CH₃ | " " | m = 4 |

TABLE 1-continued

| Dye No. | the one D″ | the other D″ | R | | Y⁵ Y⁷ | [A] |
|---|---|---|---|---|---|---|
| III. 266 | ″ | ″ | —H | R³ = —CH₃<br>R⁴ = —H | ″ ″ | m = 4 |
| III. 267 | ″ | ″ | —H | R³ = —CH₃<br>R⁴ = —CH₃ | ″ ″ | m = 4 |
| III. 268 | ″ | ″ | —H | R³ = —C₂H₅<br>R⁴ = —H | ″ ″ | m = 4 |
| III. 269 | ″ | ″ | —H | R³ = —C₂H₅<br>R⁴ = —CH₃ | ″ ″ | m = 4 |

TABLE 1

| Dye No. | the one D'' | the other D'' | R | | $Y^5$ $Y^7$ | [A] |
|---|---|---|---|---|---|---|
| III. 270 | (quinoline structure with R⁴) | (structure with R³, N, R) | —C₂H₅ | R³ = —H<br>R⁴ = —H | —CN —CN | (polyene chain) m = 4 |
| III. 271 | ″ | ″ | —C₂H₅ | R³ = —H<br>R⁴ = —CH₃ | ″ | m = 4 |
| III. 272 | ″ | ″ | —C₂H₅ | R³ = —CH₃<br>R⁴ = —H | ″ | m = 4 |
| III. 273 | ″ | ″ | —C₂H₅ | R³ = —CH₃<br>R⁴ = —CH₃ | ″ | m = 4 |
| III. 274 | ″ | ″ | —C₂H₅ | R³ = —C₂H₅<br>R⁴ = —H | ″ | m = 4 |
| III. 275 | ″ | ″ | —C₂H₅ | R³ = —C₂H₅<br>R⁴ = —CH₃ | ″ | m = 4 |
| III. 276 | ″ | ″ | -n-C₄H₉ | R³ = —H<br>R⁴ = —H | ″ | m = 4 |
| III. 277 | ″ | ″ | -n-C₄H₉ | R³ = —H<br>R⁴ = —CH₃ | ″ | m = 4 |
| III. 278 | ″ | ″ | -n-C₄H₉ | R³ = —CH₃<br>R⁴ = —H | ″ | m = 4 |
| III. 279 | ″ | ″ | -n-C₄H₉ | R³ = —CH₃<br>R⁴ = —CH₃ | ″ | m = 4 |

TABLE 1-continued

| Dye No. | the one D'' | the other D'' | R | | Y⁵ Y⁷ | [A] |
|---|---|---|---|---|---|---|
| III. 280 | " | " | -n-C₄H₉ | R³ = —C₂H₅<br>R⁴ = —H | " " | m = 4 |
| III. 281 | " | " | -n-C₄H₉ | R³ = —C₂H₅<br>R⁴ = —CH₃ | " " | m = 4 |
| III. 282 | " | (structure with benzene ring, N-R, R³-N) | (n) | R³ = —H<br>R⁴ = —H | —CN —CN | m = 4 |
| III. 283 | " | " | (n) | R³ = —H<br>R⁴ = —CH₃ | " " | m = 4 |
| III. 284 | " | " | (n) | R³ = —CH₃<br>R⁴ = —H | " " | m = 4 |
| III. 285 | " | " | (n) | R³ = —CH₃<br>R⁴ = —CH₃ | " " | m = 4 |
| III. 286 | " | " | (n) | R³ = —C₂H₅<br>R⁴ = —H | " " | m = 4 |
| III. 287 | " | " | (n) | R³ = —C₂H₅<br>R⁴ = —CH₃ | " " | m = 4 |
| III. 288 | (pyridine structure with R⁷) | (quinoline structure with R⁴, N-R) | —H | R⁴ = —H<br>R⁷ = —H | " " | m = 1 |

TABLE 1-continued

| Dye No. | the one D'' | the other D'' | R | R4/R7 | Y5 | Y7 | [A] | m |
|---|---|---|---|---|---|---|---|---|
| III. 289 | (pyridine structure with R7) | (quinoline structure with R4, N–R) | —H | R4 = —CH3, R7 = —H | " | " | (diene) | m = 1 |
| III. 290 | " | " | —H | R4 = —CH3, R7 = —H | " | " | (diene) | m = 1 |
| III. 291 | " | " | —H | R4 = —CH3, R7 = —CH3 | " | " | (diene) | m = 1 |
| III. 292 | " | " | —CH3 | R4 = —H, R7 = —H | —CN | —CN | (diene) | m = 1 |
| III. 293 | " | " | —CH3 | R4 = —CH3, R7 = —H | " | " | (diene) | m = 1 |
| III. 294 | " | " | —CH3 | R4 = —H, R7 = —CH3 | " | " | (diene) | m = 1 |
| III. 295 | " | " | —CH3 | R4 = —CH3, R7 = —CH3 | " | " | (diene) | m = 1 |
| III. 300 | " | " | —C2H5 | R4 = —H, R7 = —H | " | " | (diene) | m = 1 |
| III. 297 | " | " | —C2H5 | R4 = —CH3, R7 = —H | " | " | (diene) | m = 1 |
| III. 298 | " | " | —C2H5 | R4 = —H, R7 = —CH3 | " | " | (diene) | m = 1 |

TABLE 1-continued

| Dye No. | the one D'' | the other D'' | R | | Y⁵ | Y⁷ | [A] |
|---|---|---|---|---|---|---|---|
| III. 299 | (pyridine ring with R⁷) | (quinoline ring with R⁴, N-R) | —C₂H₅ | R⁴ = —CH₃<br>R⁷ = —CH₃ | " | " | m = 1 |
| III. 300 | " | " | —C₂H₄OH | R⁴ = —H<br>R⁷ = —H | " | " | m = 1 |
| III. 301 | " | " | —C₂H₄OH | R⁴ = —CH₃<br>R⁷ = —H | " | " | m = 1 |
| III. 302 | " | " | —C₂H₄OH | R⁴ = —H<br>R⁷ = —CH₃ | " | " | m = 1 |
| III. 303 | " | " | —C₂H₄OH | R⁴ = —CH₃<br>R⁷ = —CH₃ | " | " | m = 1 |
| III. 304 | " | " | —C₈H₁₇(n) | R⁴ = —H<br>R⁷ = —H | —CN | —CN | m = 1 |
| III. 305 | " | " | —C₈H₁₇(n) | R⁴ = —CH₃<br>R⁷ = —H | " | " | m = 1 |
| III. 306 | " | " | —C₈H₁₇(n) | R⁴ = —H<br>R⁷ = —CH₃ | " | " | m = 1 |
| III. 307 | " | " | —C₈H₁₇(n) | R⁴ = —CH₃<br>R⁷ = —CH₃ | " | " | m = 1 |
| III. 308 | " | " | —H | R⁴ = —CH₃<br>R⁷ = —H<br>R⁷ = —H | " | " | m = 2 |

TABLE 1-continued

| Dye No. | the one D" | the other D" | R | | $Y^5$ | $Y^7$ | [A] |
|---|---|---|---|---|---|---|---|
| III. 309 | ![pyridine with R⁷] | ![quinoline with R⁴, N-R] | —H | $R^4$ = —CH₃<br>$R^7$ = —H | " | " | chain, m = 2 |
| III. 310 | " | " | —H | $R^4$ = —H<br>$R^7$ = —CH₃ | " | " | chain, m = 2 |
| III. 311 | " | " | —H | $R^4$ = —CH₃<br>$R^7$ = —CH₃ | " | " | chain, m = 2 |
| III. 312 | " | " | —CH₃ | $R^4$ = —H<br>$R^7$ = —H | " | " | chain, m = 2 |
| III. 313 | " | " | —CH₃ | $R^4$ = —CH₃<br>$R^7$ = —H | " | " | chain, m = 2 |
| III. 314 | " | " | —CH₃ | $R^4$ = —H<br>$R^7$ = —CH₃ | " | " | chain, m = 2 |
| III. 315 | " | " | —CH₃ | $R^4$ = —CH₃<br>$R^7$ = —CH₃ | " | " | chain, m = 2 |
| III. 316 | " | " | —C₂H₅ | $R^4$ = —H<br>$R^7$ = —H | —CN | —CN | chain, m = 2 |
| III. 317 | " | " | —C₂H₅ | $R^4$ = —CH₃<br>$R^7$ = —H | " | " | chain, m = 2 |
| III. 318 | " | " | —C₂H₅ | $R^4$ = —H<br>$R^7$ = —CH₃ | " | " | chain, m = 2 |

TABLE 1-continued

| Dye No. | the one D'' | the other D'' | R | | Y⁵ | Y⁷ | [A] |
|---|---|---|---|---|---|---|---|
| III. 319 | " | " | —C₂H₅ | R⁴ = —CH₂<br>R⁷ = —CH₃ | " | " | m = 2 |
| III. 320 | " | " | —C₂H₄OH | R⁴ = —H<br>R⁷ = —H | " | " | m = 2 |
| III. 321 | " | " | —C₂H₄OH | R⁴ = —CH₃<br>R⁷ = —H | " | " | m = 2 |
| III. 322 | " | " | —C₂H₄OH | R⁴ = —CHJ₃<br>R⁷ = —CH₃ | " | " | m = 2 |
| III. 323 | " | " | —C₂H₄OH | R⁴ = —H<br>R⁷ = —CH₃ | " | " | m = 2 |
| III. 324 | " | " | —C₈H₁₇(n) | R⁴ = —H<br>R⁷ = —H | " | " | m = 2 |
| III. 325 | " | " | —C₈H₁₇(n) | R⁴ = —CH₃<br>R⁷ = —H | " | " | m = 2 |
| III. 326 | " | " | —C₈H₁₇(n) | R⁴ = —H<br>R⁷ = —CH₃ | " | " | m = 2 |
| III. 327 | " | " | —C₈H₁₇(n) | R⁴ = —CH₃<br>R⁷ = —CH₃ | " | " | m = 2 |
| III. 328 | 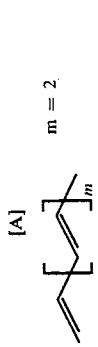 | 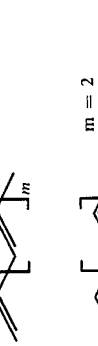 | —H | R⁴ = —H<br>R⁷ = —H | —CN | —CN | m = 3 |

TABLE 1-continued

| Dye No. | the one D" | the other D" | R | $Y^5$ | $Y^7$ | [A] |
|---|---|---|---|---|---|---|
| III. 329 | " | " | —H/ $R^4$ = —$CH_3$<br>$R^7$ = —H | " | " | m = 3 |
| III. 330 | " | " | —H    $R^4$ = —H<br>$R^7$ = —$CH_3$ | " | " | m = 3 |
| III. 331 | " | " | —H/ $R^4$ = —$CH_3$<br>$R^7$ = —$CH_3$ | " | " | m = 3 |
| III. 332 | " | " | —$CH_3$   $R^4$ = —H<br>$R^7$ = —H | " | " | m = 3 |
| III. 333 | " | " | —$CH_3$   $R^4$ = —$CH_3$<br>$R^7$ = —H | " | " | m = 3 |
| III. 334 | " | " | —$CH_3$   $R^4$ = —H<br>$R^7$ = —$CH_3$ | " | " | m = 3 |
| III. 335 | " | " | —$CH_3$   $R^4$ = —$CH_3$<br>$R^7$ = —$CH_3$ | " | " | m = 3 |
| III. 336 | " | " | —$C_2H_5$   $R_P^4$ = —H<br>$R^7$ = —H | " | " | m = 3 |
| III. 337 | " | " | —$C_2H_5$   $R^4$ = —$CHJ_3$<br>$R^7$ = —H | " | " | m = 3 |
| III. 338 | " | " | —$C_2H_5$   $R^4$ = —H<br>$R^7$ = —$CH_3$ | " | " | m = 3 |
| III. 339 | " | " | —$C_2H_5$   $R^4$ = —$CH_3$<br>$R^7$ = —$CH_3$ | " | " | m = 3 |

TABLE 1-continued

| Dye No. | the one D" | the other D" | R | | Y⁵ | Y⁷ | [A] | |
|---|---|---|---|---|---|---|---|---|
| III. 340 | (pyridine with R⁷) | (quinoline with R⁴, N-R) | —C₂H₄OH | R⁴ = —H, R⁷ = —H | —CN | —CN | (polyene) | m = 3 |
| III. 341 | " | " | —C₂H₄OH | R⁴ = —CH₃, R⁷ = —H | " | " | | m = 3 |
| III. 342 | " | " | —C₂H₄OH | R⁴ = —H, R⁷ = —CH₃ | " | " | | m = 3 |
| III. 343 | " | " | —C₂H₄OH | R⁴ = —CH₃, R⁷ = —CH₃ | " | " | | m = 3 |
| III. 344 | " | " | —C₈H₁₇(n) | R⁴ = —H, R⁷ = —H | " | " | | m = 3 |
| III. 345 | " | " | —C₈H₁₇(n) | R⁴ = —CH₃, R⁷ = —H | " | " | | m = 3 |
| III. 346 | " | " | —C₈H₁₇(n) | R⁴ = —H, R⁷ = —CH₃ | " | " | | m = 3 |
| III. 347 | " | " | —C₈H₁₇(n) | R⁴ = —CH₃, R⁷ = —CH₃ | " | " | | m = 3 |
| III. 348 | " | " | —H | R⁴ = —H, R⁷ = —H | " | " | | m = 4 |
| III. 349 | " | " | —H | R⁴ = —CH₃, R⁷ = —H | " | " | | m = 4 |

TABLE 1-continued
| Dye No. | the one D" | the other D" | R | | Y⁵ Y⁷ | [A] |
|---|---|---|---|---|---|---|
| III. 350 | | " | —H | R⁴ = —H<br>R⁷ = —CH₃ | " " | m = 4 |
| III. 351 | " | " | —H | R⁴ = —CH₃<br>R⁷ = —CH₃ | " " | m = 4 |
| III. 352 |  |  | —CH₃ | R⁴ = —H<br>R⁷ = —H | —CN —CN | m = 4 |
| III. 353 | " | " | —CH₃ | R⁴ = —CH₃<br>R⁷ = —H | " " | m = 4 |
| III. 354 | " | " | —CH₃ | R⁴ = —H<br>R⁷ = —CH₃ | " " | m = 4 |
| III. 355 | " | " | —CH₃ | R⁴ = —CH₃<br>R⁷ = —CH₃ | " " | m = 4 |
| III. 356 | " | " | —C₂H₅ | R⁴ = —H<br>R⁷ = —H | " " | m = 4 |
| III. 357 | " | " | —C₂H₅ | R⁴ = —CH₃<br>R⁷ = —H | " " | m = 4 |
| III. 358 | " | " | —C₂H₅ | R⁴ = —H<br>R⁷ = —CH₃ | " " | m = 4 |
| III. 359 | " | " | —C₂H₅ | R⁴ = —CH₃<br>R⁷ = —CH₃ | " " | m = 4 |

TABLE 1-continued

| Dye No. | the one D'' | the other D'' | R | | $Y^5$ | $Y^7$ | [A] |
|---|---|---|---|---|---|---|---|
| III.360 | (pyridine structure with $R^7$) | (quinoline structure with $R^4$, N—R) | $-C_2H_4OH$ | $R^4 = -H$ $R^7 = -H$ | " | " | chain, m = 4 |
| III.361 | " | " | $-C_2H_4OH$ | $R^4 = -CH_3$ $R^7 = -H$ | " | " | chain, m = 4 |
| III.362 | " | " | $-C_2H_4OH$ | $R^4 = -H$ $R^7 = -CH_3$ | " | " | chain, m = 4 |
| III.363 | " | " | $-C_2H_4OH$ | $R^4 = -CH_3$ $R^7 = -CH_3$ | " | " | chain, m = 4 |
| III.364 | " | " | $-C_8H_{17}(n)$ | $R^4 = -H$ $R^7 = -H$ | $-CN$ | $-CN$ | chain, m = 4 |
| III.365 | " | " | $-C_8H_{17}(n)$ | $R^4 = -CH_3$ $R^7 = -H$ | " | " | chain, m = 4 |
| III.366 | " | " | $-C_8H_{17}(n)$ | $R^4 = -H$ $R^7 = -CH_3$ | " | " | chain, m = 4 |
| III.367 | " | " | $-C_8H_{17}(n)$ | $R^4 = -CH_3$ $R^7 = -CH_3$ | " | " | chain, m = 4 |
| III.368 | " | " | $-H$ | $R^4 = -H$ $R^7 = -H$ | " | " | polyene with CN |
| III.369 | " | " | $-H$ | $R^7 = -CH_3$ $R^4 = -CH_3$ | " | " | " |
| III.370 | " | " | $-H$ | $R^7 = -H$ | " | " | " |

TABLE 1-continued

| Dye No. | the one D'' | the other D'' | R | R4/R7 | Y5 | Y7 | [A] |
|---|---|---|---|---|---|---|---|
| III.371 | [pyridine structure with R7] | [quinoline structure with R4, N-R] | —H | R4 = —CH3 | " | " | " |
| III.372 | " | " | —CH3 | R7 = —CH3, R4 = —H | " | " | " |
| III.373 | " | " | —CH3 | R7 = —H, R4 = —H | " | " | " |
| III.374 | " | " | —CH3 | R7 = —CH3, R4 = —CH3 | " | " | " |
| III.374a | " | " | —CH3 | R7 = —H, R4 = —CH3 | " | " | " |
| III.375 | " | " | —C2H5 | R4 = —H, R7 = —H | —CN | —CN | [A] (polyene-CN structure) |
| III.376 | " | " | —C2H5 | R4 = —H | " | " | " |
| III.377 | " | " | —C2H5 | R7 = —CH3, R4 = —CH3 | " | " | " |
| III.378 | " | " | —C2H5 | R7 = —H, R4 = —H | " | " | " |
| III.379 | " | " | —C2H4OH | R7 = —CH3, R4 = —H | " | " | " |
| III.380 | " | " | —C2H4OH | R7 = —H, R4 = —H | " | " | " |
| III.381 | " | " | —C2H4OH | R7 = —CH3, R4 = —CH3 | " | " | " |
| III.382 | " | " | —C2H4OH | R7 = —H, R4 = —H | " | " | " |
| III.383 | " | " | —C8H17(n) | R7 = —H, R4 = —H | " | " | " |
| III.384 | " | " | —C8H17(n) | R7 = —CH3 | " | " | " |

TABLE 1-continued

| Dye No. | the one D'' | the other D'' | R | | $Y^5$ | $Y^7$ | [A] |
|---|---|---|---|---|---|---|---|
| III. 385 | '' | '' | —C$_8$H$_{17}$(n) | R$^4$ = —CH$_3$ | '' | '' | '' |
| III. 386 | '' | '' | —C$_8$H$_{17}$(n) | R$^7$ = —H R$^4$ = —CH$_3$ R$^7$ = —CH$_3$ | '' | '' | '' |

TABLE 1

| Dye No. | the one D'' | the other D'' | R | | $Y^5$ | $Y^7$ | [A] |
|---|---|---|---|---|---|---|---|
| III. 387 | (pyridine) | (quinoline with N-R, R⁴) | —H | $R^4$ = —H | —CN | —CN | m = 1 |
| III. 388 | " | " | —H | $R^4$ = —CH₃ | " | " | m = 1 |
| III. 389 | " | " | —CH₃ | $R^4$ = —H | " | " | m = 1 |
| III. 390 | " | " | —CH₃ | $R^4$ = —CH₃ | " | " | m = 1 |
| III. 391 | " | " | —C₂H₅ | $R^4$ = —H | " | " | m = 1 |
| III. 392 | " | " | —C₂H₅ | $R^4$ = —CH₃ | " | " | m = 1 |
| III. 393 | " | " | —C₂H₄OH | $R^4$ = —H | " | " | m = 1 |
| III. 394 | " | " | —C₂H₄OH | $R^4$ = —CH₃ | " | " | m = 1 |
| III. 395 | " | " | —C₁₂H₂₅(n) | $R^4$ = —H | " | " | m = 1 |
| III. 396 | " | " | —C₁₂H₂₅(n) | $R^4$ = —CH₃ | " | " | m = 1 |

TABLE 1-continued

| Dye No. | the one D'' | the other D'' | R | | Y⁵ | Y⁷ | [A] |
|---|---|---|---|---|---|---|---|
| III. 397 | (pyridine) | (quinoline with R⁴, N-R) | —H | R⁴ = —H | " | " | m = 2 |
| III. 398 | " | " | —H | R⁴ = —CH₃ | " | " | m = 2 |
| III. 399 | " | " | —CH₃ | R⁴ = —H | " | " | m = 2 |
| III. 400 | " | " | —CH₃ | R⁴ = —CH₃ | " | " | m = 2 |
| III. 401 | " | " | —C₂H₅ | R⁴ = —H | " | " | m = 2 |
| III. 402 | " | " | —C₂H₅ | R⁴ = —CH₃ | " | " | m = 2 |
| III. 403 | " | " | —C₂H₄OH | R⁴ = —H | —CN | —CN | m = 2 |
| III. 404 | " | " | —C₂H₄OH | R⁴ = —CH₃ | " | " | m = 2 |
| III. 405 | " | " | —C₁₂H₂₅(n) | R⁴ = —H | " | " | m = 2 |
| III. 406 | " | " | —C₁₂H₂₅(n) | R⁴ = —CH₃ | " | " | m = 2 |

TABLE 1-continued

| Dye No. | the one D'' | the other D'' | R | R⁴ | Y⁵ Y⁷ | [A] |
|---|---|---|---|---|---|---|
| III.407 | " | " | —H | R⁴ = —H | " " | m = 3 |
| III.408 | " | " | —H | R⁴ = —CH₃ | " " | m = 3 |
| III.409 | " | " | —CH₃ | R⁴ = —H | " " | m = 3 |
| III.410 | " | " | —CH₃ | R⁴ = —CH₃ | " " | m = 3 |
| III.411 | " | " | —C₂H₅ | R⁴ = —H | " " | m = 3 |
| III.412 | " | " | —C₂H₅ | R⁴ = —CH₃ | " " | m = 3 |
| III.413 | " | " | —C₂H₄OH | R⁴ = —H | " " | m = 3 |
| III.414 | " | " | —C₂H₄OH | R⁴ = —CH₃ | " " | m = 3 |
| III.415 | " | " | —C₁₂H₂₅(n) | R⁴ = —H | " " | m = 3 |
| III.416 | " | " | —C₁₂H₂₅(n) | R⁴ = —CH₃ | " " | m = 3 |
| III.417 | " | " | —H | R⁴ = —H | " " | m = 4 |

TABLE 1-continued
| Dye No. | the one D'' | the other D'' | R | R⁴ | $Y^5$ | $Y^7$ | [A] |
|---|---|---|---|---|---|---|---|
| III. 418 | " | " | —H | $R^4$ = —$CH_3$ | " | " | m = 4 |
| III. 419 | " | " | —$CH_3$ | $R^4$ = —H | " | " | m = 4 |
| III. 420 | 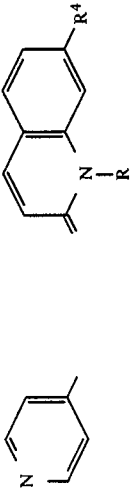 | 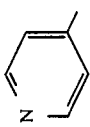 | —$CH_3$ | $R^4$ = —$CH_3$ | —CN | —CN | m = 4 |
| III. 421 | " | " | —$C_2H_5$ | $R^4$ = —H | " | " | m = 4 |
| III. 422 | " | " | —$C_2H_5$ | $R^4$ = —$CH_3$ | " | " | m = 4 |
| III. 423 | " | " | —$C_2H_4OH$ | $R^4$ = —H | " | " | m = 4 |
| III. 424 | " | " | —$C_2H_4OH$ | $R^4$ = —$CH_3$ | " | " | m = 4 |
| III. 425 | " | " | —$C_{12}H_{25}(n)$ | $R^4$ = —H | " | " | m = 4 |
| III. 426 | " | " | —$C_{12}H_{25}(n)$ | $R^4$ = —$CH_3$ | " | " | m = 4 |

TABLE 1-continued

| Dye No. | the one D'' | the other D'' | R | | $Y^5$ | $Y^7$ | [A] |
|---|---|---|---|---|---|---|---|
| III. 427 | pyrazine | quinoline-R⁴ | —H | $R^4 = $ —H | " | " | m = 1 |
| III. 428 | " | " | —H | $R^4 = $ —CH₃ | " | " | m = 1 |
| III. 429 | " | " | —CH₃ | $R^4 = $ —H | " | " | m = 1 |
| III. 430 | " | " | —CH₃ | $R^4 = $ —CH₃ | " | " | m = 1 |
| III. 431 | " | " | —C₂H₅ | $R^4 = $ —H | " | " | m = 1 |
| III. 432 | " | " | —C₂H₅ | $R^4 = $ —CH₃ | " | " | m = 1 |
| III. 433 | " | " | —C₂H₄OH | $R^4 = $ —H | " | " | m = 1 |
| III. 434 | " | " | —C₂H₄OH | $R^4 = $ —CH₃ | —CN | —CN | m = 1 |
| III. 435 | " | " | —C₁₂H₂₅(n) | $R^4 = $ —H | " | " | m = 1 |

TABLE 1-continued

| Dye No. | the one D'' | the other D'' | R | | Y⁵ | Y⁷ | [A] |
|---|---|---|---|---|---|---|---|
| III. 436 | " | " | —C₁₂H₂₅(n) | R⁴ = —CH₃ | " | " | m = 1 |
| III. 437 | " | " | —H | R⁴ = —H | " | " | m = 2 |
| III. 438 | " | " | —H | R⁴ = —CH₃ | " | " | m = 2 |
| III. 439 | " | " | —CH₃ | R⁴ = —H | " | " | m = 2 |
| III. 440 | " | " | —CH₃ | R⁴ = —CH₃ | " | " | m = 2 |
| III. 441 | " | " | —C₂H₅ | R⁴ = —H | " | " | m = 2 |
| III. 442 | " | " | —C₂H₅ | R⁴ = —CH₃ | " | " | m = 2 |
| III. 443 | " | " | —C₂H₄OH | R⁴ = —H | " | " | m = 2 |
| III. 444 | " | " | —C₂H₄OH | R⁴ = —CH₃ | " | " | m = 2 |
| III. 445 | " | " | —C₁₂H₂₅(n) | R⁴ = —H | " | " | m = 2 |
| III. 446 | " | " | —C₁₂H₂₅(n) | R⁴ = —CH₃ | " | " | m = 2 |

TABLE 1-continued

| Dye No. | the one D'' | the other D'' | R | R⁴ | Y⁵ | Y⁷ | [A] |
|---|---|---|---|---|---|---|---|
| III. 447 | pyrazine | quinoline with R⁴ and N—R | —H | R⁴ = —H | " | " | m = 3 |
| III. 448 | " | " | —H | R⁴ = —CH₃ | " | " | m = 3 |
| III. 449 | " | " | —CH₃ | R⁴ = —H | " | " | m = 3 |
| III. 450 | " | " | —CH₃ | R⁴ = —CH₃ | " | " | m = 3 |
| III. 451 | " | " | —C₂H₅ | R⁴ = —H | —CN | —CN | m = 3 |
| III. 452 | " | " | —C₂H₅ | R⁴ = —CH₃ | " | " | m = 3 |
| III. 453 | " | " | —C₂H₄OH | R⁴ = —H | " | " | m = 3 |
| III. 454 | " | " | —C₂H₄OH | R⁴ = —CH₃ | " | " | m = 3 |
| III. 455 | " | " | —C₁₂H₂₅(n) | R⁴ = —H | " | " | m = 3 |
| III. 456 | " | " | —C₁₂H₂₅(n) | R⁴ = —CH₃ | " | " | m = 3 |

TABLE 1-continued
| Dye No. | the one D'' | the other D'' | R | R⁴ | Y⁵ | Y⁷ | [A] |
|---|---|---|---|---|---|---|---|
| III. 457 | " | " | —H | R⁴ = —H | " | " | 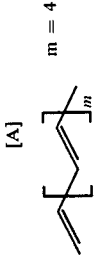 m = 4 |
| III. 458 | " | " | —H | R⁴ = —CH₃ | " | " | 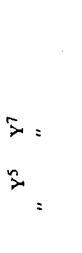 m = 4 |
| III. 459 | " | " | —CH₃ | R⁴ = —H | " | " | 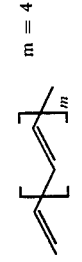 m = 4 |
| III. 460 | " | " | —CH₃ | R⁴ = —CH₃ | " | " |  m = 4 |
| III. 461 | " | " | —C₂H₅ | R⁴ = —H | " | " |  m = 4 |
| III. 462 | " | " | —C₂H₅ | R⁴ = —CH₃ | " | " |  m = 4 |
| III. 463 | " | " | —C₂H₄OH | R⁴ = —H | " | " | 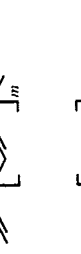 m = 4 |
| III. 464 | " | " | —C₂H₄OH | R⁴ = —CH₃ | " | " | 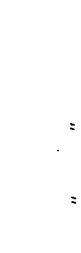 m = 4 |
| III. 465 | " | " | —C₁₂H₂₅(n) | R⁴ = —H | " | " |  m = 4 |
| III. 466 | " | " | —C₁₂H₂₅(n) | R⁴ = —CH₃ | " | " |  m = 4 |

TABLE 1-continued

| Dye No. | the one D'' | the other D'' | R | | $Y^5$ | $Y^7$ | [A] | |
|---|---|---|---|---|---|---|---|---|
| III. 467 | (structure) | (structure) | —H | $R^4 = $ —H | —CN | —CN | (diene) | m = 1 |
| III. 468 | " | " | —H | $R^4 = $ —CH$_3$ | " | " | (diene) | m = 1 |
| III. 469 | " | " | —CH$_3$ | $R^4 = $ —H | " | " | (diene) | m = 1 |
| III. 470 | " | " | —CH$_3$ | $R^4 = $ —CH$_3$ | " | " | (diene) | m = 1 |
| III. 471 | " | " | —C$_2$H$_5$ | $R^4 = $ —H | " | " | (diene) | m = 1 |
| III. 472 | " | " | —C$_2$H$_5$ | $R^4 = $ —CH$_3$ | " | " | (diene) | m = 1 |
| III. 473 | " | " | —C$_8$H$_{17}$(n) | $R^4 = $ —H | " | " | (diene) | m = 1 |
| III. 474 | " | " | —C$_8$H$_{17}$(n) | $R^4 = $ —CH$_3$ | " | " | (diene) | m = 1 |
| III. 475 | " | " | —H | $R^4 = $ —H | " | " | (diene) | m = 2 |
| III. 476 | " | " | —H | $R^4 = $ —CH$_3$ | " | " | (diene) | m = 2 |

TABLE 1-continued
| Dye No. | the one D″ | the other D″ | R | | $Y^5$ | $Y^7$ | [A] | |
|---|---|---|---|---|---|---|---|---|
| III. 477 | 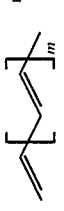 |  | —CH$_3$ | R$^4$ = —H | ″ | ″ |  | m = 2 |
| III. 478 | ″ | ″ | —CH$_3$ | R$^4$ = —CH$_3$ | ″ | ″ |  | m = 2 |
| III. 479 | ″ | ″ | —C$_2$H$_5$ | R$^4$ = —H | ″ | ″ |  | m = 2 |
| III. 480 | ″ | ″ | —C$_2$H$_5$ | R$^4$ = —CH$_3$ | ″ | ″ |  | m = 2 |
| III. 481 | ″ | ″ | —C$_8$H$_{17}$(n) | R$^4$ = —H | ″ | ″ |  | m = 2 |
| III. 482 | ″ | ″ | —C$_8$H$_{17}$(n) | R$^4$ = —CH$_3$ | ″ | ″ |  | m = 2 |
| III. 483 | ″ | ″ | —H | R$^4$ = —H | —CN | —CN |  | m = 3 |
| III. 484 | ″ | ″ | —H | R$^4$ = —CH$_3$ | ″ | ″ |  | m = 3 |
| III. 485 | ″ | ″ | —CH$_3$ | R$^4$ = —H | ″ | ″ |  | m = 3 |
| III. 486 | ″ | ″ | —CH$_3$ | R$^4$ = —CH$_3$ | ″ | ″ |  | m = 3 |

TABLE 1-continued

| Dye No. | the one D" | the other D" | R | | $Y^5$ | $Y^7$ | [A] |
|---|---|---|---|---|---|---|---|
| III. 487 | " | " | $-C_2H_5$ | $R^4 = -H$ | " | " | m = 3 |
| III. 488 | " | " | $-C_2H_5$ | $R^4 = -CH_3$ | " | " | m = 3 |
| III. 489 | " | " | $-C_8H_{17}(n)$ | $R^4 = -H$ | " | " | m = 3 |
| III. 490 | " | " | $-C_8H_{17}(n)$ | $R^4 = -CH_3$ | " | " | m = 3 |
| III. 491 | " | " | $-H$ | $R^4 = -H$ | " | " | m = 4 |
| III. 492 | " | " | $-H$ | $R^4 = -CH_3$ | " | " | m = 4 |
| III. 493 | " | " | $-CH_3$ | $R^4 = -H$ | " | " | m = 4 |
| III. 494 | " | " | $-CH_3$ | $R^4 = -CH_3$ | " | " | m = 4 |
| III. 495 | " | " | $-C_2H_5$ | $R^4 = -H$ | " | " | m = 4 |
| III. 496 | " | " | $-C_2H_5$ | $R^4 = -CH_3$ | " | " | m = 4 |
| III. 497 | " | " | $-C_8H_{17}(n)$ | $R^4 = -H$ | " | " | m = 4 |

TABLE 1-continued

| Dye No. | the one D'' | the other D'' | R | | $Y^5$ | $Y^7$ | [A] |
|---|---|---|---|---|---|---|---|
| III. 498 | (quinoline) | (naphthalene-N,S) | —C$_8$H$_{17}$(n) | $R^4$ = —CH$_3$ | | 41 | m = 4 |
| III. 499 | " | " | —H | $R^4$ = —H | —CN | —CN | m = 1 |
| III. 500 | " | " | —H | $R^4$ = —CH$_3$ | " | " | m = 1 |
| III. 501 | " | " | —H | $R^4$ = —H | " | " | m = 2 |
| III. 502 | " | " | —H | $R^4$ = —CH$_3$ | " | " | m = 2 |
| III. 503 | " | " | —H | $R^4$ = —H | " | " | m = 3 |
| III. 504 | " | " | —H | $R^4$ = —CH$_3$ | " | " | m = 3 |
| III. 505 | " | " | —H | $R^4$ = —H | " | " | m = 4 |
| III. 506 | " | " | —H | $R^4$ = —CH$_3$ | " | " | m = 4 |

TABLE 1-continued

| Dye No. | the one D'' | the other D'' | R | R⁴ | Y⁵ | Y⁷ | [A] |
|---|---|---|---|---|---|---|---|
| III. 507 | (quinoline with R⁴) | (benzoquinoline with N—R) | —H | R⁴ = —H | | | m = 1 |
| III. 508 | " | " | —H | R⁴ = —CH₃ | " | " | m = 1 |
| III. 509 | " | " | —CH₃ | R⁴ = —H | " | " | m = 1 |
| III. 510 | " | " | —CH₃ | R⁴ = —CH₃ | —CN | —CN | m = 1 |
| III. 511 | " | " | C₂H₅ | R⁴ = —H | " | " | m = 1 |
| III. 512 | " | " | C₂H₅ | R⁴ = —CH₃ | " | " | m = 1 |
| III. 513 | " | " | —C₈H₁₇(n) | R⁴ = —H | " | " | m = 1 |
| III. 514 | " | " | —C₈H₁₇(n) | R⁴ = —CH₃ | " | " | m = 1 |

TABLE 1-continued

| Dye No. | the one D" | the other D" | R | | Y⁵ Y⁷ | [A] |
|---|---|---|---|---|---|---|
| III. 515 | " | " | —H | R⁴ = —H | " " | m = 2 |
| III. 516 | " | " | —H | R⁴ = —CH₃ | " " | m = 2 |
| III. 517 | " | " | —CH₃ | R⁴ = —H | " " | m = 2 |
| III. 518 | " | " | —CH₃ | R⁴ = —CH₃ | " " | m = 2 |
| III. 519 | " | " | —C₂H₅ | R⁴ = —H | " " | m = 2 |
| III. 520 | " | " | —C₂H₅ | R⁴ = —CH₃ | " " | m = 2 |
| III. 521 | " | " | —C₈H₁₇(n) | R⁴ = —H | " " | m = 2 |
| III. 522 | " | " | —C₈H₁₇(n) | R⁴ = —CH₃ | " " | m = 2 |
| III. 523 | " | " | —H | R⁴ = —H | " " | m = 3 |
| III. 524 | " | " | —H | R⁴ = —CH₃ | " " | m = 3 |
| III. 525 | " | " | —CH₃ | R⁴ = —H | " " | m = 3 |

TABLE 1-continued

| Dye No. | the one D'' | the other D'' | R | R⁴ | Y⁵ | Y⁷ | [A] |
|---|---|---|---|---|---|---|---|
| III. 526 | | | —CH₃ | R⁴ = —CH₃ | —CN | —CN | m = 1 |
| III. 527 | " | " | —C₂H₅ | R⁴ = —H | " | " | m = 3 |
| III. 528 | " | " | —C₂H₅ | R⁴ = —CH₃ | " | " | m = 3 |
| III. 529 | " | " | —C₈H₁₇(n) | R⁴ = —H | " | " | m = 3 |
| III. 530 | " | " | —C₈H₁₇(n) | R⁴ = —CH₃ | " | " | m = 3 |
| III. 531 | " | " | —H | R⁴ = —H | " | " | m = 4 |
| III. 532 | " | " | —H | R⁴ = —CH₃ | " | " | m = 4 |
| III. 533 | " | " | —CH₃ | R⁴ = —H | " | " | m = 4 |
| III. 534 | " | " | —CH₃ | R⁴ = —CH₃ | " | " | m = 4 |
| III. 535 | " | " | —C₂H₅ | R⁴ = —H | " | " | m = 4 |

TABLE 1-continued

| Dye No. | the one D'' | the other D'' | R | | Y⁵ | Y⁷ | [A] |
|---|---|---|---|---|---|---|---|
| III. 536 | " | " | —C₂H₅ | R⁴ = —CH₃ | " | " | $\left[\diagup\diagdown\right]_m$ m = 4 |
| III. 537 | " | " | —C₈H₁₇(n) | R⁴ = —H | " | " | $\left[\diagup\diagdown\right]_m$ m = 4 |
| III. 538 | " | " | —C₈H₁₇(n) | R⁴ = —CH₃ | " | " | $\left[\diagup\diagdown\right]_m$ m = 4 |

TABLE 1

| Dye No. | the one D'' | the other D'' | R | R⁴ | Y⁵ | Y⁷ | [A] |
|---|---|---|---|---|---|---|---|
| III. 539 | (structure with R⁴) | (structure with N—R, R⁴) | —H | $R^4 =$ —H | —CN | —H | $m = 1$ |
| III. 540 | " | " | —H | $R^4 =$ —CH$_3$ | " | " | $m = 1$ |
| III. 541 | " | " | —CH$_3$ | $R^4 =$ —H | " | " | $m = 1$ |
| III. 542 | " | " | —CH$_3$ | $R^4 =$ —CH$_3$ | " | " | $m = 1$ |
| III. 543 | " | " | —C$_2$H$_5$ | $R^4 =$ —H | " | " | $m = 1$ |
| III. 544 | " | " | —C$_2$H$_5$ | $R^4 =$ —CH$_3$ | " | " | $m = 1$ |
| III. 545 | " | " | —C$_2$H$_4$OH | $R^4 =$ —H | " | " | $m = 1$ |
| III. 546 | " | " | —C$_2$H$_4$OH | $R^4 =$ —CH$_3$ | " | " | $m = 1$ |
| III. 547 | " | " | —C$_{12}$H$_{25}$(n) | $R^4 =$ —H | " | " | $m = 1$ |
| III. 548 | " | " | —C$_{12}$H$_{25}$(n) | $R^4 =$ —CH$_3$ | " | " | $m = 1$ |

TABLE 1-continued
| Dye No. | the one D'' | the other D'' | R | | Y⁵ | Y⁷ | [A] |
|---|---|---|---|---|---|---|---|
| III. 549 | 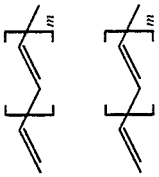 | " | —H | R⁴ = —H | " | —H | m = 2 |
| III. 550 | " | " | —H | R⁴ = —CH₃ | " | " | m = 2 |
| III. 551 | " | " | —CH₃ | R⁴ = —H | " | " | m = 2 |
| III. 552 | " | " | —CH₃ | R⁴ = —CH₃ | " | " | m = 2 |
| III. 553 | " | " | —C₂H₅ | R⁴ = —H | " | " | m = 2 |
| III. 554 | " | " | —C₂H₅ | R⁴ = —CH₃ | " | " | m = 2 |
| III. 555 | " | " | —C₂H₄OH | R⁴ = —H | " | " | m = 2 |
| III. 556 | " | " | —C₂H₄OH | R⁴ = —CH₃ | —CN | —H | m = 2 |
| III. 556 a | " | " | —C₂H₄OH | R⁴ = —CH₃ | " | " | m = 2 |
| III. 557 | " | " | —C₁₂H₂₅(n) | R⁴ = —H | " | " | m = 2 |

TABLE 1-continued

| Dye No. | the one D'' | the other D'' | R | | $Y^5$ | $Y^7$ | [A] | |
|---|---|---|---|---|---|---|---|---|
| III. 558 | " | " | —C₁₂H₂₅(n) | R⁴ = —CH₃ | " | " | | m = 2 |
| III. 559 | " | " | —H | R⁴ = —H | " | " | | m = 3 |
| III. 560 | " | " | —H | R⁴ = —CH₃ | " | " | | m = 3 |
| III. 561 | " | " | —CH₃ | R⁴ = —H | " | " | | m = 3 |
| III. 562 | " | " | —CH₃ | R⁴ = —CH₃ | " | " | | m = 3 |
| III. 563 | " | " | —C₂H₅ | R⁴ = —H | " | " | | m = 3 |
| III. 564 | " | " | —C₂H₅ | R⁴ = —CH₃ | " | " | | m = 3 |
| III. 565 | " | " | —C₂H₄OH | R⁴ = —H | " | " | | m = 3 |
| III. 566 | " | " | —C₂H₄OH | R⁴ = —CH₃ | " | " | | m = 3 |
| III. 567 | " | " | —C₁₂H₂₅(n) | R⁴ = —H3 | " | " | | m = 3 |
| III. 568 | " | " | —C₁₂H₂₅(n) | R⁴ = —CH₃ | " | " | | m = 3 |

TABLE 1-continued

| Dye No. | the one D'' | the other D'' | R | | Y⁵ Y⁷ | [A] |
|---|---|---|---|---|---|---|
| III. 569 | (quinoline structure with R⁴) | (quinoline structure with N—R, R⁴) | —H | R⁴ = —H | Y⁵ = —CN, Y⁷ = —H | m = 4 |
| III. 570 | " | " | —H | R⁴ = —CH₃ | " | m = 4 |
| III. 571 | " | " | —CH₃ | R⁴ = —H | " | m = 4 |
| III. 572 | " | " | —CH₃ | R⁴ = —CH₃ | " | m = 4 |
| III. 573 | " | " | —C₂H₅ | R⁴ = —H | " | m = 4 |
| III. 574 | " | " | —C₂H₅ | R⁴ = —CH₃ | " | m = 4 |
| III. 575 | " | " | —C₂H₄OH | R⁴ = —H | " | m = 4 |
| III. 576 | " | " | —C₂H₄OH | R⁴ = —CH₃ | " | m = 4 |
| III. 577 | " | " | —C₁₂H₂₅(n) | R⁴ = —H | " | m = 4 |
| III. 578 | " | " | —C₁₂H₂₅(n) | R⁴ = —CH₃ | " | m = 4 |

TABLE 1-continued

| Dye No. | the one D'' | the other D'' | R | | $Y^5$ | $Y^7$ | [A] |
|---|---|---|---|---|---|---|---|
| III. 579 | (phenyl-N-R ring) | (naphtho-N-R) | —H | $R^4 =$ —H | | | m = 1 |
| III. 580 | " | " | —H | $R^4 =$ —CH$_3$ | " | " | m = 1 |
| III. 581 | " | " | —CH$_3$ | $R^4 =$ —H | " | " | m = 1 |
| III. 582 | " | " | —CH$_3$ | $R^4 =$ —CH$_3$ | " | " | m = 1 |
| III. 583 | " | " | —C$_2$H$_5$ | $R^4 =$ —H | " | " | m = 1 |
| III. 584 | " | " | —C$_2$H$_5$ | $R^4 =$ —CH$_3$ | —CN | —H | m = 1 |
| III. 585 | " | " | —C$_2$H$_4$OH | $R^4 =$ —H | " | " | m = 1 |
| III. 586 | " | " | —C$_2$H$_4$OH | $R^4 =$ —CH$_3$ | " | " | m = 1 |

TABLE 1-continued
| Dye No. | the one D'' | the other D'' | R | | $Y^5$ | $Y^7$ | [A] |
|---|---|---|---|---|---|---|---|
| III. 587 | " | " | $-C_{12}H_{25}(n)$ | $R^4 = -H$ | " | " | 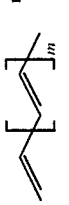 m = 1 |
| III. 588 | " | " | $-C_{12}H_{25}(n)$ | $R^4 = -CH_3$ | " | " | 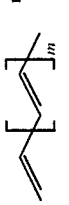 m = 1 |
| III. 589 | " | " | $-H$ | $R^4 = -H$ | " | " | 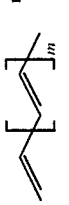 m = 2 |
| III. 590 | " | " | $-H$ | $R^4 = -CH_3$ | " | " | 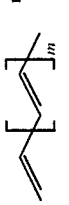 m = 2 |
| III. 591 | " | " | $-CH_3$ | $R^4 = -H$ | " | " | 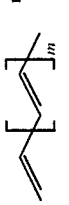 m = 2 |
| III. 592 | " | " | $-CH_3$ | $R^4 = -CH_3$ | " | " | 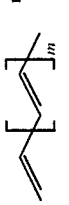 m = 2 |
| III. 593 | " | " | $-C_2H_5$ | $R^4 = -H$ | " | " | 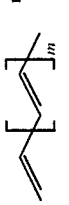 m = 2 |
| III. 594 | " | " | $-C_2H_5$ | $R^4 = -CH_3$ | " | " | 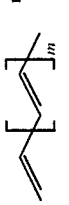 m = 2 |
| III. 595 | " | " | $-C_2H_4OH$ | $R^4 = -H$ | " | " | 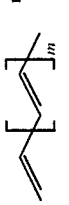 m = 2 |
| III. 596 | " | " | $-C_2H_4OH$ | $R^4 = -CH_3$ | " | " | 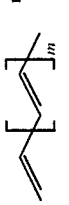 m = 2 |
| III. 597 | " | " | $-C_{12}H_{25}(n)$ | $R^4 = -H$ | " | " | 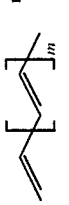 m = 2 |

TABLE 1-continued

| Dye No. | the one D'' | the other D'' | R | | Y⁵ | Y⁷ | [A] |
|---|---|---|---|---|---|---|---|
| III. 598 | " | " | —C₁₂H₂₅(n) | R⁴ = —CH₃ | " | " | m = 2 |
| III. 599 | " | " | —H | R⁴ = —H | " | " | m = 3 |
| III. 600 | " | " | —H | R⁴ = —CH₃ | —CN | —H | m = 4 |
| III. 601 | " | " | —CH₃ | R⁴ = —H | " | " | m = 3 |
| III. 602 | " | " | —CH₃ | R⁴ = —CH₃ | " | " | m = 3 |
| III. 603 | " | " | —C₂H₅ | R⁴ = —H | " | " | m = 3 |
| III. 604 | " | " | —C₂H₅ | R⁴ = —CH₃ | " | " | m = 3 |
| III. 605 | " | " | —C₂H₄OH | R⁴ = —H | " | " | m = 3 |
| III. 606 | " | " | —C₂H₄OH | R⁴ = —CH₃ | " | " | m = 3 |
| III. 607 | " | " | —C₁₂H₂₅(n) | R⁴ = —H | " | " | m = 3 |
| III. 608 | " | " | —C₁₂H₂₅(n) | R⁴ = —CH₃ | " | " | m = 3 |

TABLE 1-continued

| Dye No. | the one D'' | the other D'' | R | | $Y^5$ | $Y^7$ | [A] |
|---|---|---|---|---|---|---|---|
| III. 609 | " | " | —H | $R^4=$ —H | " | " | m = 4 |
| III. 610 | " | " | —H | $R^4=$ —CH$_3$ | " | " | m = 4 |
| III. 611 | " | " | —CH$_3$ | $R^4=$ —H | " | " | m = 4 |
| III. 612 | " | " | —CH$_3$ | $R^4=$ —CH$_3$ | " | " | m = 4 |
| III. 613 | " | " | —C$_2$H$_5$ | $R^4=$ —H | " | " | m = 4 |
| III. 614 | " | " | —C$_2$H$_5$ | $R^4=$ —CH$_3$ | " | " | m = 4 |
| III. 615 | " | " | —C$_2$H$_4$OH | $R^4=$ —H | " | " | m = 4 |
| III. 616 | " | " | —C$_2$H$_4$OH | $R^4=$ —CH$_3$ | " | " | m = 4 |
| III. 617 | " | " | —C$_{12}$H$_{25}$(n) | $R^4=$ —H | " | " | m = 4 |
| III. 618 | " | " | —C$_{12}$H$_{25}$(n) | $R^4=$ —CH$_3$ | " | " | m = 4 |

TABLE 1-continued

| Dye No. | the one D'' | the other D'' | R | R⁴ | Y⁵ | Y⁷ | [A] |
|---|---|---|---|---|---|---|---|
| III. 619 | " | ![structure](N-R on benzene) | —H | R⁴ = —H | —CN | —H | m = 1 |
| III. 620 | " | " | —H | R⁴ = —CH₃ | " | " | m = 1 |
| III. 621 | " | " | —CH₃ | R⁴ = —H | " | " | m = 1 |
| III. 622 | " | " | —CH₃ | R⁴ = —CH₃ | " | " | m = 1 |
| III. 623 | " | " | —C₂H₅ | R⁴ = —H | " | " | m = 1 |
| III. 624 | " | " | —C₂H₅ | R⁴ = —CH₃ | " | " | m = 1 |
| III. 625 | " | " | —C₈H₁₇(n) | R⁴ = —H | " | " | m = 1 |
| III. 626 | " | " | —C₈H₁₇(n) | R⁴ = —CH₃ | " | " | m = 1 |
| III. 627 | " | " | —H | R⁴ = —H | " | " | m = 2 |
| III. 628 | " | " | —H | R⁴ = —CH₃ | " | " | m = 2 |

TABLE 1-continued

| Dye No. | the one D'' | the other D'' | R | | $Y^5$ | $Y^7$ | [A] | |
|---|---|---|---|---|---|---|---|---|
| III. 629 | " | " | —CH$_3$ | R$^4$ = —H | " | " | | m = 2 |
| III. 630 | " | " | —CH$_3$ | R$^4$ = —CH$_3$ | " | " | | m = 2 |
| III. 631 | " | " | —C$_2$H$_5$ | R$^4$ = —H | " | " | | m = 2 |
| III. 632 | " | " | —C$_2$H$_5$ | R$^4$ = —CH$_3$ | " | " | | m = 2 |
| III. 633 | " | " | —C$_8$H$_{17}$(n) | R$^4$ = —H | " | " | | m = 2 |
| III. 634 | " | " | —C$_8$H$_{17}$(n) | R$^4$ = —CH$_3$ | " | " | | m = 2 |
| III. 635 | " | " | —H | R$^4$ = —H | " | " | | m = 3 |
| III. 636[a] | " | " | —H | R$^4$ = —CH$_3$ | —CN | —H | | m = 2 |
| III. 636 | " | " | —H | R$^4$ = —CH$_3$ | " | " | | m = 3 |
| III. 637 | " | " | —CH$_3$ | R$^4$ = —H | " | " | | m = 3 |
| III. 638 | " | " | —CH$_3$ | R$^4$ = —CH$_3$ | " | " | | m = 3 |

TABLE 1-continued

| Dye No. | the one D″ | the other D″ | R | | $Y^5$ | $Y^7$ | [A] |
|---|---|---|---|---|---|---|---|
| III. 639 | " | " | $-C_2H_5$ | $R^4 = -H$ | " | " | m = 3 |
| III. 640 | " | " | $-C_2H_5$ | $R^4 = -CH_3$ | " | " | m = 3 |
| III. 641 | " | " | $-C_8H_{17}(n)$ | $R^4 = -H$ | " | " | m = 3 |
| III. 642 | " | " | $(C_8H_{17}(n)$ | $R^4 = -CH_3$ | " | " | m = 3 |
| III. 643 | " | " | $-H$ | $R^4 = -H$ | " | " | m = 4 |
| III. 644 | " | " | $-H$ | $R^4 = -CH_3$ | " | " | m = 4 |
| III. 645 | " | " | $-CH_3$ | $R^4 = -H$ | " | " | m = 4 |
| III. 646 | " | " | $-CH_3$ | $R^4 = -CH_3$ | " | " | m = 4 |
| III. 647 | " | " | $-C_2H_5$ | $R^4 = -H$ | " | " | m = 4 |
| III. 648 | " | " | $-C_2H_5$ | $R^4 = -CH_3$ | " | " | m = 4 |
| III. 649 | " | " | $-C_8H_{17}(n)$ | $R^4 = -H$ | " | " | m = 4 |

TABLE 1-continued

| Dye No. | the one D'' | the other D'' | R | $R^4$ | $Y^5$ | $Y^7$ | [A] |
|---|---|---|---|---|---|---|---|
| III. 650 | " | structure with H₃C, CH₃, phenyl, N—R | —C₈H₁₇(n) | $R^4$ = —CH₃ | " | " | m = 4 |
| III. 651 | " | " | —CH₃ | $R^4$ = —H | —CN | —H | m = 1 |
| III. 652 | " | " | —CH₃ | $R^4$ = —CH₃ | " | " | m = 1 |
| III. 653 | " | " | —C₂H₅ | $R^4$ = —H | " | " | m = 1 |
| III. 654 | " | " | —C₂H₅ | $R^4$ = —CH₃ | " | " | m = 1 |
| III. 655 | " | " | —CH₃ | $R^4$ = —H | " | " | m = 2 |
| III. 656 | " | " | —CH₃ | $R^4$ = —CH₃ | " | " | m = 2 |
| III. 657 | " | " | —C₂H₅ | $R^4$ = —H | " | " | m = 2 |
| III. 658 | " | " | —C₂H₅ | $R^4$ = —CH₃ | " | " | m = 2 |
| III. 659 | " | " | —CH₃ | $R^4$ = —H | " | " | m = 3 |

TABLE 1-continued
| Dye No. | the one D" | the other D" | R | R⁴ | Y⁵ | Y⁷ | [A] |
|---|---|---|---|---|---|---|---|
| III. 660 | " | " | —CH₃ | R⁴ = —CH₃ | " | " | 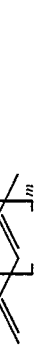 m = 3 |
| III. 661 | " | " | —C₂H₅ | R⁴ = —H | " | " | 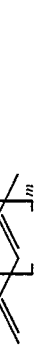 m = 3 |
| III. 662 | " | " | —C₂H₅ | R⁴ = —CH₃ | " | " | 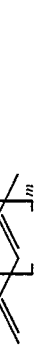 m = 3 |
| III. 663 | " | " | —CH₃ | R⁴ = —H | " | " | 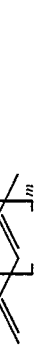 m = 4 |
| III. 664 | " | " | —CH₃ | R⁴ = —CH₃ | " | " | 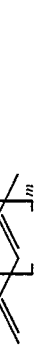 m = 4 |
| III. 665 | " | " | —C₂H₅ | R⁴ = —H | " | " | 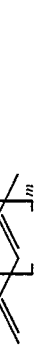 m = 4 |
| III. 666 | " | " | —C₂H₅ | R⁴ = —CH₃ | " | " | 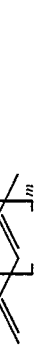 m = 4 |

TABLE 1

| Dye No. | the one D'' | the other D'' | R | | $Y^5$ | $Y^7$ | [A] | |
|---|---|---|---|---|---|---|---|---|
| III. 667 | " | ⟨benzothiazole-N-R⟩ | —H | $R^4$ = —H | —CN | —H | (chain) | m = 1 |
| III. 668 | " | " | —H | $R^4$ = —CH$_3$ | " | " | (chain) | m = 1 |
| III. 669 | " | " | —CH$_3$ | $R^4$ = —H | " | " | (chain) | m = 1 |
| III. 670 | " | " | —CH$_3$ | $R^4$ = —CH$_3$ | " | " | (chain) | m = 1 |
| III. 671 | " | " | —C$_2$H$_5$ | $R^4$ = —H | " | " | (chain) | m = 1 |
| III. 672 | " | " | —C$_2$H$_5$ | $R^4$ = —CH$_3$ | " | " | (chain) | m = 1 |
| III. 673 | " | " | —C$_8$H$_{17}$(n) | $R^4$ = —H | " | " | (chain) | m = 1 |
| III. 674 | " | " | —C$_8$H$_{17}$(n) | $R^4$ = —CH$_3$ | " | " | (chain) | m = 1 |
| III. 675 | " | " | —H | $R^4$ = —H | " | " | (chain) | m = 2 |
| III. 676 | " | " | —H | $R^4$ = —CH$_3$ | " | " | (chain) | m = 2 |

TABLE 1-continued

| Dye No. | the one D'' | the other D'' | R | | $Y^5$ | $Y^7$ | [A] |
|---|---|---|---|---|---|---|---|
| III. 677 | " | " | —CH₃ | $R^4$ = —H | " | " | m = 2 |
| III. 678 | " | " | —CH₃ | $R^4$ = —CH₃ | " | " | m = 2 |
| III. 679 | " | " | —C₂H₅ | $R^4$ = —H | " | " | m = 2 |
| III. 680 | " | " | —C₂H₅ | $R^4$ = —CH₃ | " | " | m = 2 |
| III. 681 | " | " | —C₈H₁₇(n) | $R^4$ = —H | " | " | m = 2 |
| III. 682 | " | " | —C₈H₁₇(n) | $R^4$ = —CH₃ | " | " | m = 2 |
| III. 683 | " | " | —H | $R^4$ = —H | —CN | —H | m = 4 |
| III. 684 | " | " | —H | $R^4$ = —CH₃ | " | " | m = 3 |
| III. 685 | " | " | —CH₃ | $R^4$ = —H | " | " | m = 3 |
| III. 686 | " | " | —CH₃ | $R^4$ = —CH₃ | " | " | m = 3 |
| III. 687 | " | " | —C₂H₅ | $R^4$ = —H | " | " | m = 3 |

TABLE 1-continued

| Dye No. | the one D'' | the other D'' | R | R⁴ | Y⁵ | Y⁷ | [A] |
|---|---|---|---|---|---|---|---|
| III. 688 | " | " | —C₂H₅ | R⁴ = —CH₃ | " | " | m = 3 |
| III. 689 | " | " | —C₈H₁₇(n) | R⁴ = —H | " | " | m = 3 |
| III. 690 | " | " | —C₈H₁₇(n) | R⁴ = —CH₃ | " | " | m = 3 |
| III. 691 | " | " | —H | R⁴ = —H | " | " | m = 4 |
| III. 692 | " | " | —H | R⁴ = —CH₃ | " | " | m = 4 |
| III. 693 | " | " | —CH₃ | R⁴ = —H | " | " | m = 4 |
| III. 694 | " | " | —CH₃ | R⁴ = —CH₃ | " | " | m = 4 |
| III. 695 | " | " | —C₂H₅ | R⁴ = —H | " | " | m = 4 |
| III. 696 | " | " | —C₂H₅ | R⁴ = —CH₃ | " | " | m = 4 |
| III. 697 | " | " | —C₈H₁₇(n) | R⁴ = —H | " | " | m = 4 |
| III. 698 | " | " | —C₈H₁₇(n) | R⁴ = —CH₃ | " | " | m = 4 |

TABLE 1-continued

| Dye No. | the one D'' | the other D'' | R | | | [A] |
|---|---|---|---|---|---|---|
| III. 699 | " | (N,N'-dimethyl benzimidazolone structure) | | R⁴ = —H | Y⁵ = —CN, Y⁷ = —H | m = 1 |
| III. 700 | " | " | | R⁴ = —CH₃ | " | m = 1 |
| III. 701 | " | " | | R⁴ = —H | " | m = 2 |
| III. 702 | " | " | | R⁴ = —CH₃ | " | m = 2 |
| III. 703 | " | " | | R⁴ = —H | " | m = 3 |
| III. 704 | " | " | | R⁴ = —CH₃ | " | m = 3 |
| III. 705 | " | " | | R⁴ = —H | " | m = 4 |
| III. 706 | " | " | | R⁴ = —CH₃ | " | m = 4 |
| III. 707 | " | (N,N'-dimethyl uracil structure) | | R⁴ = —H | Y⁵ = —CN, Y⁷ = —H | m = 1 |

TABLE 1-continued

| Dye No. | the one D'' | the other D'' | R | Y⁵ | Y⁷ | [A] |
|---|---|---|---|---|---|---|
| III. 708 | ![pyridine with R⁷] | ![quinoline] | —H | $R^4 = -CH_3$ | " | m = 1 |
| III. 709 | " | " | " | $R^4 = -H$ | " | m = 2 |
| III. 710 | " | " | " | $R^4 = -CH_3$ | " | m = 2 |
| III. 711 | " | " | " | $R^4 = -H$ | " | m = 3 |
| III. 712 | " | " | " | $R^4 = -CH_3$ | " | m = 3 |
| III. 713 | " | " | " | $R^4 = -H$ | " | m = 4 |
| III. 714 | " | " | " | $R^4 = -CH_3$ | " | m = 4 |
| III. 715 | " | " | " | $R^4 = -H$ | —CN | —CN (structure with CN) |
| III. 716 | " | ![pyridine with R⁸, N—R] | " | $R^7 = -CH_3$<br>$R^8 = -CH_3$ | " | m = 2 |

TABLE 1-continued

| Dye No. | the one D'' | the other D'' | R | | $Y^5$ $Y^7$ | [A] |
|---|---|---|---|---|---|---|
| III. 717 | | | " | $R^7 = -H$ $R^3 = -C_2H_5$ | " " | m = 1 |
| III. 718 | | | —H | $R^8 = -H$ | —CN —CN | m = 1 |
| III. 719 | " | " | " | $R^8 = -CH_3$ | " " | m = 1 |
| III. 720 | " | " | " | $R^3 = -C_2H_5$ | " " | m = 1 |
| III. 721 | | | —H | $R^7 = -H$ | —CN —CN | |
| III. 722 | | | " | $R^4 = -H$ | —CN " | |
| III. 723 | | | $C_2H_5$ | $R^4 = -CH_3$ | —CN —H | m = 1 |

TABLE 1-continued

| Dye No. | the one D'' | the other D'' | R | | Y⁵ | Y⁷ | [A] |
|---|---|---|---|---|---|---|---|
| III. 724 | | R¹¹ | CH₃ | R¹¹ = CH₃ | " | " | m = 1 |
| III. 725 | | | —H | — | | | |
| III. 726 | " | | | | —CN | —CN | |
| III. 727 | | | —H | — | | | |
| III. 728 | " | " | " | | —CN | —CN | |
| III. 729 | " | " | " | | " | " | |

TABLE 1-continued

| Dye No. | the one D'' | the other D'' | R | Y⁵ | Y⁷ | [A] |
|---|---|---|---|---|---|---|
| III. 730 | pyridine | N—H pyridone | | " | " | azulene with divinyl |
| III. 731 | quinoline | quinoline | " | " | " | |
| III. 732 | " | " | " | CN | CN | diene with 2 Cl |
| III. 733 | " | " | " | " | " | pyridyl diene |

The novel dyes (I) are prepared by condensing methylene compounds of the formula (IV)

C.–120° C. Possible C-3, C-5, C-7, C-9 and C-11 units are for example:

C-3: 1,1,3,3-tetramethoxypropane, 2-cyanomalonaldehyde, 2-fluoromalonaldehyde, 2-chloromalonaldehyde, 2-bromomalonaldehyde and

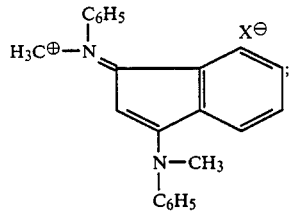

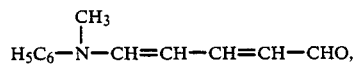
C-5

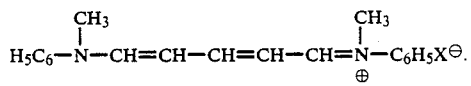

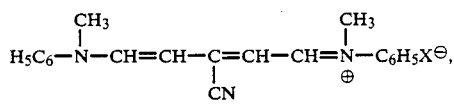

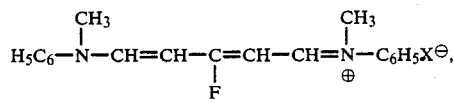

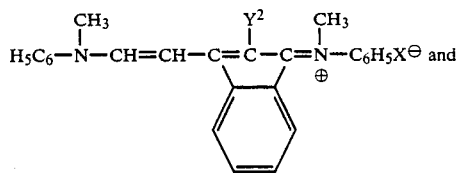

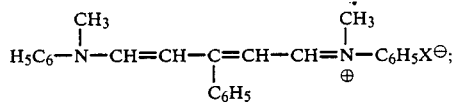

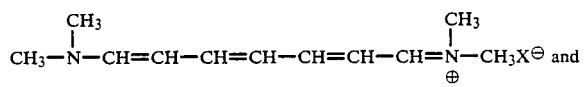
C-7

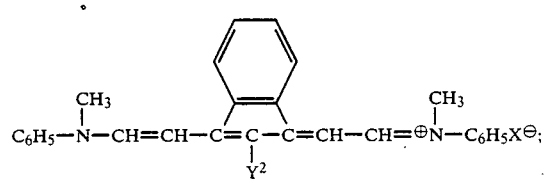

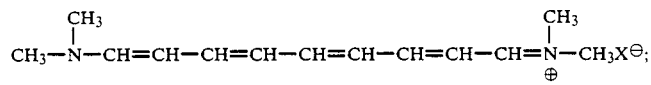
C-9

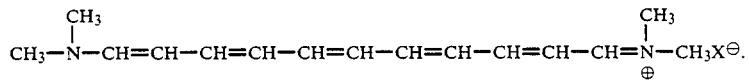
C-11

with C-3, C-5, C-7, C-9 or C-11 units under acid or alkaline conditions in the presence of a solvent at 20° C.

In the formulae, $X^\ominus$ is one equivalent of an anion, for example $Cl^\ominus$, $\frac{1}{2}ZnCl_4{}^{2-}$, $Br^\ominus$, $I^\ominus$, tosylate, benzenesulfonate, trifluoroacetate, tetrafluoroborate and perchlorate.

$Y^2$ has the abovementioned meanings.

Suitable solvents for the reactions are for example dimethylformamide, N-methylpyrrolidone, dimethoxyethane, ethylene glycol monomethyl ether or mixtures thereof.

The invention also relates to a process for preparing symmetrical heptamethines of the formula

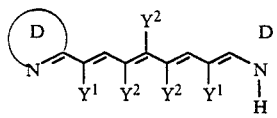

(V)

in which D, $Y^1$ and $Y^2$ have the abovementioned meanings, by reacting methylene compounds of the formula

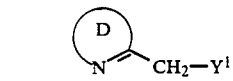

(IV)

with pyridinium salts of the formula

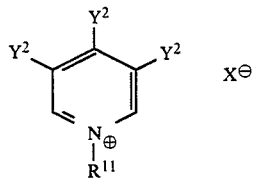

where $Y^2$ has the abovementioned meanings, $X^\ominus$ is one equivalent of an anion and $R^{11}$ is $C_1$–$C_8$-alkyl or $C_7$–$C_{10}$-aralkyl.

The reaction of ethylene compounds of the formula (IV) with 1,1,3,3-tetramethoxypropanes which are substituted in the 2-position by $Y^2$ gives under suitable reaction conditions 1:1 products, salts of the formula (VI)

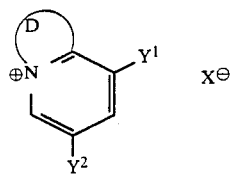

(VI)

These can be reacted directly or, if desired, after intermediate isolation or after ring opening to the aldehydes of the formula (VII):

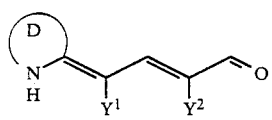

(VII)

with methylene compounds of the formula (IV) to give symmetrical or asymmetrical pentamethines of the formula (VIIIa) or with cyclammonium to give pentamethines of the formula (VIIa).

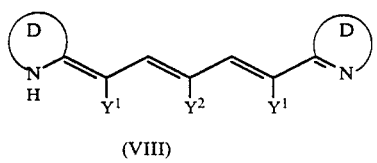

(VIII)

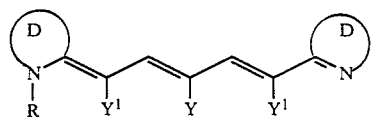

(VIIIa, R ≠ H)

Suitable cyclammonium compounds are for example:

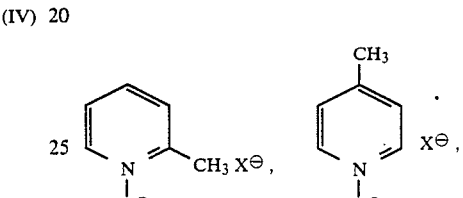

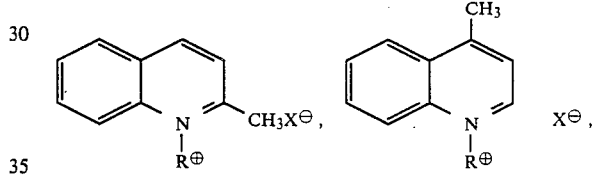

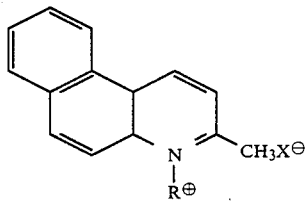

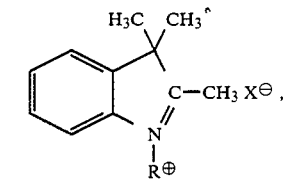

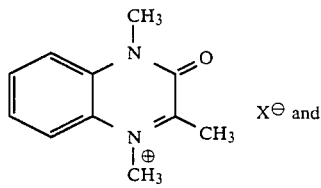

$X^\ominus$ and

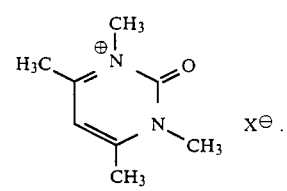

$X^\ominus$.

where R and $X^\ominus$ have the abovementioned meanings, although $X^\ominus$ can also be $H_3CSO_4^\ominus$ and $C_2H_5SO_4^\ominus$.

The reaction of alkyl cyanide with 2 moles of (VI) or (VII) leads to undecamethines of the formula (X)

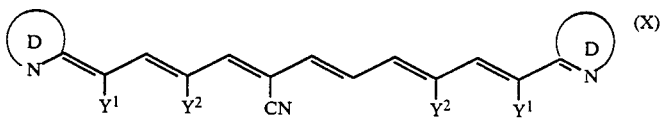
(X)

The aldehydes of the formula (VII) can be converted by reaction with dicarboxylic acids or functional derivatives thereof into polymethines of the formula (IX). In the formula (IX), D, $Y^2$ and $Y^1$ have the abovementioned meanings

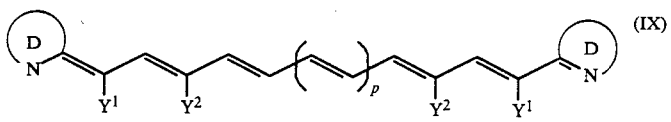
(IX)

and p is 0, 1, 2 or 3. In this process the radicals D are preferably identical. In this way it is possible to obtain nonamethines (p=0) from malonic acid, undecamethines (p=1) from glutaconic acid and tridecamethines (p=2) from piperylenedicarboxylic acid.

Starting from the salts (VI) or the corresponding aldehydes (VII), the longer-chain methines in particular those which are substituted in the chain, are accessible by the following pathways:

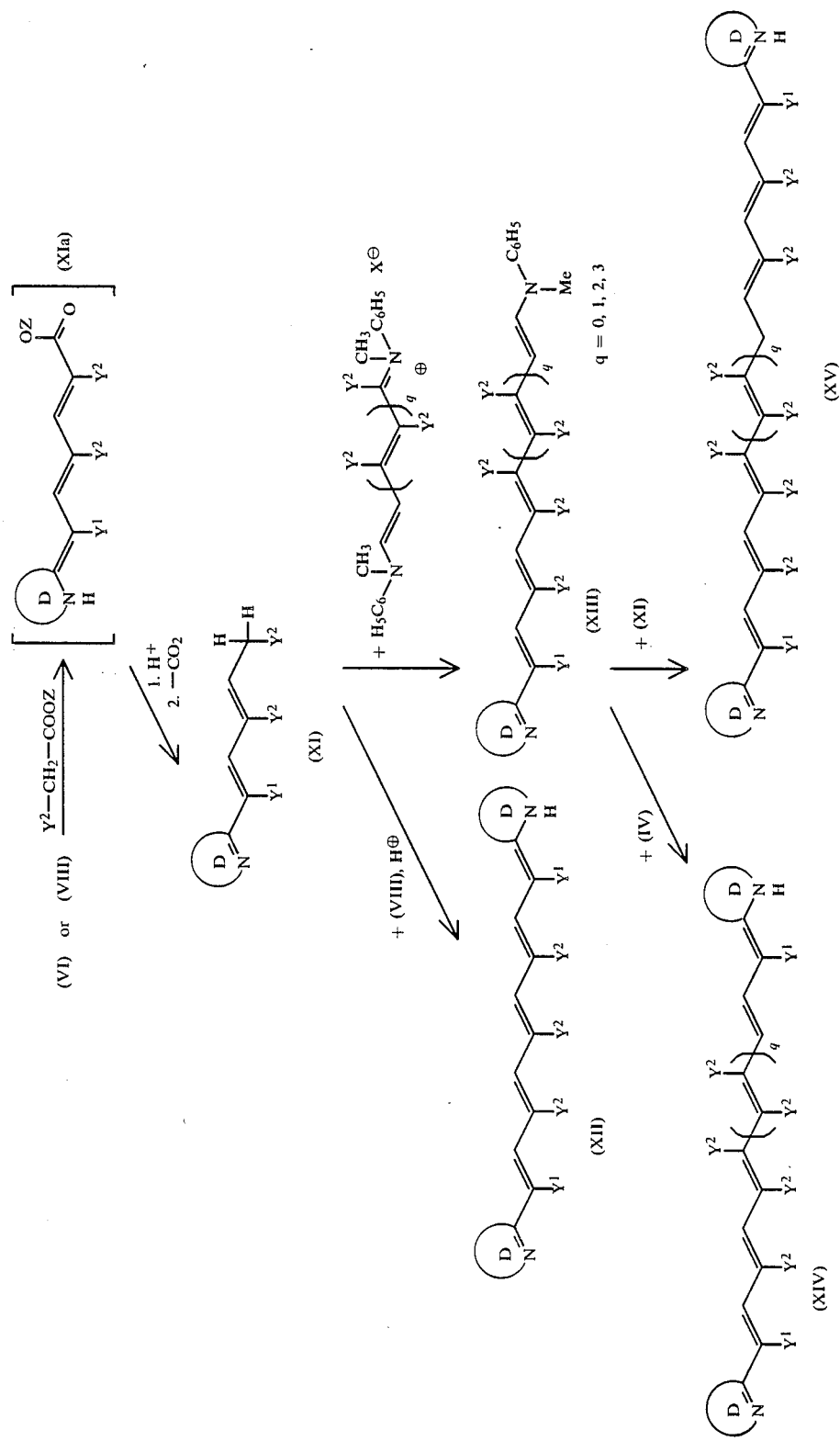

In the formulae (XI) to (XV),
Y$^1$ is preferably —CN,
Y$^2$ is preferably chlorine, phenyl, pyridyl, —CN, hydrogen or together with a further Y$^2$ a five- or six-membered ring which may have a fused-on benzene ring,
q is 0, 1, 2 or 3, and
Z is C$_1$–C$_4$-alkyl.

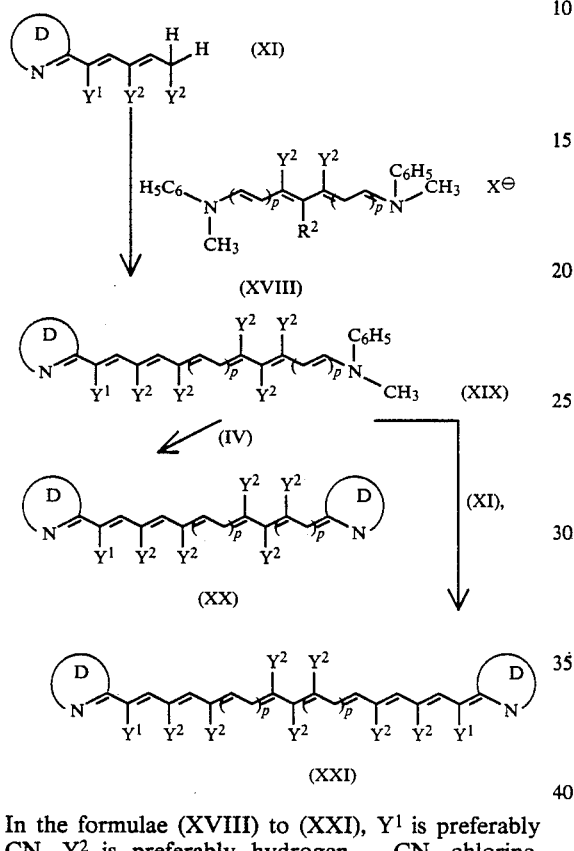

In the formulae (XVIII) to (XXI), Y$^1$ is preferably —CN, Y$^2$ is preferably hydrogen, —CN, chlorine, phenyl, pyridyl or together with a further Y$^2$ a five- or six-membered ring which may be have a fused-on benzene ring and p is 0, 1, 2 or 3.

The new methine dyes (I) can be converted in a conventional manner by protonation or alkylation into cationic methine dyes of the formula (XVI). The radicals R, which have the abovementioned meanings, can be identical or different.

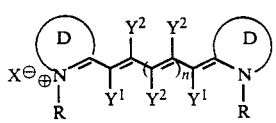

Suitable alkylating agents are for example: dimethyl sulfate, diethyl sulfate, trimethyloxonium tetrafluoroborate, triethyloxonium tetrafluoroborate, methyl, ethyl, n-propyl, n-butyl, iso-butyl, sec.-butyl, n-pentyl, 3-methylbutyl, n-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl chloride, bromide or iodide, and methyl, ethyl, n-propyl, n-butyl, sec.-butyl, iso-butyl, n-pentyl, 3-methylbutyl, n-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl benzene- or p-toluene-sulfonate.

X$^\ominus$ is one equivalent of an anion and, in addition to the meanings already mentioned for X$^\ominus$, can also have the meaning H$_3$CSO$_4$$^\ominus$ and H$_5$C$_2$SO$_4$$^\ominus$.

Examples of the dyes are the dyes of the formula (XVI) mentioned in Table 2:

TABLE 2

| Dye No. from Table 1 | the one R | the other R |
|---|---|---|
| III. 1 | —H | —H |
| III. 2 | —C$_2$H$_5$ | —C$_8$H$_{17}$(n) |
| III. 4 | —C$_{12}$H$_{25}$(n) | —C$_{12}$H$_{25}$(n) |
| III. 5 | —H | —H |
| III. 7 | -n-C$_4$H$_9$ | -n-C$_4$H$_9$ |
| III. 8 | —C$_{12}$H$_{25}$(n) | —C$_{20}$H$_{21}$(n) |
| III. 9 | —H | —H |
| III. 11 | -n-C$_4$H$_9$ | —C$_{10}$H$_{21}$(n) |
| III. 14 | —C$_2$H$_5$ | —H |
| III. 14 | —C$_2$H$_5$ | —C$_{12}$H$_{25}$(n) |
| III. 17 | —H | —H |
| III. 19 | —C$_2$H$_5$ | —H |
| III. 24 | —C$_2$H$_5$ | —C$_2$H$_5$ |
| III. 34 | —C$_2$H$_5$ | —C$_2$H$_5$ |
| III. 34 | —C$_2$H$_5$ | —C$_8$H$_{17}$(n) |
| III. 40 | -n-C$_4$H$_9$ | -n-C$_4$H$_9$ |
| III. 47 | —C$_2$H$_5$ | —C$_2$H$_5$ |
| III. 48 | —C$_2$H$_5$ | —C$_2$H$_5$ |
| III. 58 | —C$_2$H$_5$ | —C$_5$H$_{11}$(n) |
| III. 63 | -n-C$_4$H$_9$ | —C$_{10}$H$_{21}$(n) |
| III. 65 | —H | —H |
| III. 66 | —H | —H |
| III. 67 | —H | —H |
| III. 68 | —H | —H |
| III. 69 | —H | —H |
| III. 71 | —H | —H |
| III. 74 | —H | —H |
| III. 76 | —H | —C$_{12}$H$_{25}$(n) |
| III. 77 | —H | —H |
| III. 78 | —C$_2$H$_5$ | —H |
| III. 81 | —H | —H |
| III. 82 | —C$_2$H$_5$ | —C$_2$H$_5$ |
| III. 83 | —H | —H |
| III. 85 | —H | —H |
| III. 87 | —H | —H |
| III. 87 | —C$_8$H$_{17}$(n) | —C$_8$H$_{17}$(n) |
| III. 88 | —H | —H |
| III. 89 | —CH$_3$ | —CH$_3$ |
| III. 91 | —C$_2$H$_4$OH | —C$_2$H$_5$ |
| III. 97 | —C$_{12}$H$_{25}$(n) | —C$_{12}$H$_{25}$(n) |
| III. 98 | —H | —H |
| III. 100 | —C$_2$H$_5$ | —C$_9$H$_{19}$(n) |
| III. 103 | —H | —H |
| III. 105 | —C$_2$H$_5$ | —CH$_2$—CH(C$_2$H$_5$)—C$_4$H$_9$ |
| III. 108 | —H | —H |
| III. 110 | —C$_2$H$_5$ | —C$_{16}$H$_{35}$(n) |
| III. 118 | —H | —H |
| III. 119 | —CH$_3$ | —C$_8$H$_{17}$(n) |
| III. 125 | —C$_2$H$_5$ | —C$_{10}$H$_{21}$(n) |
| III. 128 | —H | —H |
| III. 132 | —C$_2$H$_5$ | —H |
| III. 132 | —C$_2$H$_5$ | —C$_2$H$_5$ |
| III. 135 | —H | —H |
| III. 136 | —C$_{12}$H$_{25}$(n) | —C$_{12}$H$_{25}$(n) |
| III. 138 | —H | —H |
| III. 139 | —H | —H |
| III. 142 | —H | —H |
| III. 144 | —H | —H |
| III. 146 | —H | —H |
| III. 147 | —H | —H |
| III. 150 | —H | —H |
| III. 154 | —H | —H |
| III. 156 | —CH$_3$ | —C$_{12}$H$_{25}$(n) |
| III. 158 | —C$_2$H$_5$ | —C$_{10}$H$_{21}$(n) |
| III. 160 | —H | —H |

TABLE 2-continued

| Dye No. from Table 1 | the one R | the other R |
|---|---|---|
| III. 162 | —C₂H₅ | —C₂H₅ |
| III. 164 | -n-C₄H₉ | —C₈H₁₇(n) |
| III. 166 | —C₁₂H₂₅(n) | —C₁₂H₂₅(n) |
| III. 168 | —H | —H |
| III. 169 | —H | —H |
| III. 170 | —C₂H₅ | —C₁₀H₂₁(n) |
| III. 174 | —C₁₂H₂₅(n) | —C₁₂H₂₅(n) |
| III. 176 | —H | —H |
| III. 178 | —C₂H₅ | —C₂₀H₄₁(n) |
| III. 184 | —H | —H |
| III. 186 | —C₂H₅ | —C₁₀H₂₁(n) |
| III. 192 | —H | —H |
| III. 194 | —H | —H |
| III. 195 | —H | —H |
| III. 198 | —C₂H₅ | —H |
| III. 200 | —C₂H₅ | —H |
| III. 200 | —C₂H₅ | —C₂H₅ |
| III. 202 | —C₂H₅ | —C₈H₁₇(n) |
| III. 210 | —C₈H₁₇(n) | —H |
| III. 216 | —H | —H |
| III. 222 | —C₂H₅ | —H |
| III. 224 | —C₂H₅ | —H |
| III. 226 | —C₂H₅ | —C₂H₅ |
| III. 236 | —C₈H₁₇(n) | —H |
| III. 240 | —H | —H |
| III. 245 | —H | —H |
| III. 250 | —C₂H₅ | —C₂H₅ |
| III. 256 | -n-C₄H₉ | -n-C₄H₉ |
| III. 264 | —H | —H |
| III. 268 | —H | —H |
| III. 270 | —C₂H₅ | —H |
| III. 274 | —C₂H₅ | —C₂H₅ |
| III. 282 | —C₈H₁₇(n) | —H |
| III. 284 | —C₈H₁₇(n) | —C₂H₅ |
| III. 288 | —H | —H |
| III. 290 | —H | —H |
| III. 291 | —H | —H |
| III. 294 | —CH₃ | —C₂₀H₄₁(n) |
| III. 297 | —C₂H₅ | —C₂H₅ |
| III. 302 | —C₂H₄OH | —C₂H₅ |
| III. 307 | —C₈H₁₇(n) | —H |
| III. 311 | —H | —H |
| III. 315 | —CH₃ | —C₂H₅ |
| III. 319 | —C₂H₅ | —C₅H₁₁(n) |
| III. 324 | —C₈H₁₇(n) | —C₈H₁₇(n) |
| III. 326 | —C₈H₁₇(n) | -n-C₄H₉ |
| III. 328 | —H | —H |
| III. 331 | —H | —H |
| III. 335 | —CH₃ | —C₂H₅ |
| III. 340 | —C₂H₄OH | —H |
| III. 346 | —C₈H₁₇(n) | —H |
| III. 353 | —CH₃ | —CH₃ |
| III. 357 | —C₂H₅ | -n-C₄H₉ |
| III. 363 | —C₂H₄OH | —C₂H₅ |
| III. 367 | —C₈H₁₇(n) | -n-C₄H₉ |
| III. 368 | —H | —H |
| III. 371 | —H | —H |
| III. 377 | —C₂H₅ | —C₂H₅ |
| III. 382 | —C₂H₄OH | —C₂H₅ |
| III. 388 | —H | —H |
| III. 395 | —C₁₂H₂₅(n) | —C₆H₁₃(n) |
| III. 402 | —C₂H₅ | —C₂H₅ |
| III. 407 | —H | —H |
| III. 408 | —H | —H |
| III. 412 | —C₂H₅ | -n-C₄H₉ |
| III. 416 | —C₁₂H₂₅(n) | —H |
| III. 423 | —C₂H₄OH | —C₂H₅ |
| III. 427 | —H | —H |
| III. 430 | —CH₃ | —CH₃ |
| III. 435 | —C₁₂H₂₅(n) | —H |
| III. 441 | —C₂H₅ | -n-C₄H₉ |
| III. 448 | —H | —H |
| III. 454 | —C₂H₄OH | —C₂H₅ |
| III. 458 | —H | —H |
| III. 462 | —C₂H₅ | -n-C₄H₉ |
| III. 467 | —H | —H |
| III. 468 | —H | —H |
| III. 472 | —C₂H₅ | -n-C₄H₉ |
| III. 478 | —CH₃ | —CH₂—CH(C₂H₅)—C₄H |
| III. 480 | —C₂H₅ | —H |
| III. 485 | —CH₃ | —H |
| III. 489 | —C₈H₁₇(n) | —C₈H₁₇(n) |
| III. 491 | —H | —H |
| III. 495 | —C₂H₅ | —C₂H₅ |
| III. 498 | —C₈H₁₇(n) | -n-C₄H₉ |
| III. 499 | —H | —H |
| III. 503 | —H | —H |
| III. 507 | —H | —H |
| III. 512 | —C₂H₅ | —CH₃ |
| III. 515 | —H | —H |
| III. 520 | —C₂H₅ | —H |
| III. 521 | —C₈H₁₇(n) | —C₈H₁₇(n) |
| III. 526 | —CH₃ | -n-C₄H₉ |
| III. 530 | —C₈H₁₇(n) | —H |
| III. 531 | —H | —H |
| III. 535 | —C₂H₅ | —C₂H₅ |
| III. 539 | —H | —H |
| III. 542 | —CH₃ | —CH₃ |
| III. 543 | —C₂H₅ | —H |
| III. 545 | —C₂H₄OH | —H |
| III. 547 | —C₁₂H₂₅(n) | —H |
| III. 549 | —H | —H |
| III. 550 | —H | —H |
| III. 556 | —C₂H₄OH | —C₂H₅ |
| III. 557 | —C₁₂H₂₅(n) | —C₁₂H₂₅(n) |
| III. 559 | —H | —H |
| III. 560 | —H | —H |
| III. 567 | —C₁₂H₂₅(n) | —H |
| III. 569 | —H | —H |
| III. 572 | —CH₃ | —C₂H₅ |
| III. 573 | —C₂H₅ | —C₁₀H₂₁(n) |
| III. 579 | —H | —H |
| III. 583 | —C₂H₅ | —H |
| III. 584 | —C₂H₅ | —C₂H₅ |
| III. 589 | —H | —H |
| III. 593 | —C₂H₅ | —C₂H₅ |
| III. 598 | —C₁₂H₂₅(n) | —H |
| III. 599 | —H | —H |
| III. 601 | —CH₃ | —C₁₂H₂₅(n) |
| III. 604 | —C₂H₅ | —H |
| III. 609 | —H | —H |
| III. 612 | —CH₃ | -n-C₄H₉ |
| III. 617 | —C₁₂H₂₅(n) | —H |
| III. 619 | —H | —H |
| III. 621 | —CH₃ | —H |
| III. 623 | —C₂H₅ | —C₂H₅ |
| III. 627 | —H | —H |
| III. 628 | —H | —H |
| III. 633 | —C₈H₁₇(n) | —H |
| III. 635 | —H | —H |
| III. 639 | —C₂H₅ | —C₂H₅ |
| III. 641 | —C₈H₁₇(n) | —C₈H₁₇(n) |
| III. 643 | —H | —H |
| III. 645 | —CH₃ | —C₂H₅ |
| III. 649 | —C₈H₁₇(n) | —H |
| III. 651 | —CH₃ | —H |
| III. 654 | —C₂H₅ | —C₂H₅ |
| III. 658 | —C₂H₅ | -n-C₄H₉ |
| III. 664 | —CH₃ | —H |
| III. 667 | —H | —H |
| III. 670 | —CH₃ | —CH₃ |
| III. 671 | —C₂H₅ | —C₁₀H₂₁(n) |
| III. 680 | —C₂H₅ | —C₂H₅ |
| III. 682 | —C₈H₁₇(n) | —C₈H₁₇(n) |
| III. 689 | —C₈H₁₇(n) | -n-C₄H₉ |
| III. 695 | —C₂H₅ | —H |
| III. 699 | —CH₃ | —H |
| III. 702 | —CH₃ | —H |
| III. 706 | —CH₃ | -n-C₄H₉ |
| III. 707 | —H | —H |
| III. 711 | —CH₃ | —C₈H₁₇(n) |
| III. 715 | —H | —H |
| III. 716 | —H | —H |
| III. 717 | —H | —H |
| III. 718 | —H | —H |

TABLE 2-continued

| Dye No. from Table 1 | the one R | the other R |
|---|---|---|
| III. 719 | —H | —H |
| III. 720 | —H | —H |
| III. 720 | —C$_2$H$_5$ | —H |
| III. 721 | —C$_2$H$_5$ | —H |
| III. 721 | —H | —H |
| III. 722 | —H | —H |
| III. 722 | —C$_2$H$_5$ | —H |
| III. 722 | —C$_2$H$_5$ | —H |
| III. 723 | —H | —C$_2$H$_5$ |
| III. 724 | —C$_2$H$_5$ | —C$_2$H$_5$ |
| III. 725 | —C$_8$H$_{17}$ | —H |
| III. 726 | —CH$_3$ | —CH$_3$ |
| III. 727 | —C$_2$H$_5$ | —C$_2$H$_5$ |
| III. 728 | —H | —H |
| III. 729 | —C$_2$H$_5$ | —C$_2$H$_5$ |
| III. 730 | —CH$_3$ | —CH$_3$ |
| III. 731 | —H | —H |
| III. 732 | —C$_2$H$_5$ | —H |
| III. 733 | —CH$_3$ | —CH$_3$ |

The novel methine dyes of the formula (Ia)

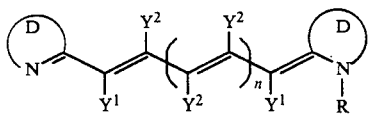

(Ia; R = H)

where D, Y$^1$, Y$^2$ and n have the abovementioned meaning and R is hydrogen, can be converted in a conventional manner by deprotonation into anionic dyes of the formula (XVII)

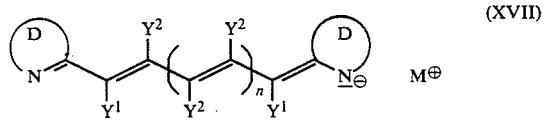

(XVII)

where D, Y$^1$, Y$^2$ and n have the abovementioned meanings and M$^\oplus$ is one equivalent of a cation. M$^\oplus$ is for example a lithium, sodium, potassium, cesium, calcium, ammonium, tetraphenylarsonium or tetraalkylammonium ion such as tetramethyl-, tetraethyl-, tetrabutyl-, trimethylbenzyl-, triethylbenzyl- or trimethyldecyl-ammonium ion. The anions of the formula (XVII) are prepared by reacting the methine dyes of the formula (Ia) with bases such as alkali metal hydroxides, sodium alcoholates or potassium tert.-butylate in a solvent at 0°–40° C. Suitable solvents are for example: dimethylformamide and N-methylpyrrolidone.

The compounds of the formulae (XVI) and (XVII) likewise form part of the subject-matter of the present invention.

The

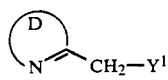

compounds required as starting materials and the C-3 and C-11 units are known or can be prepared in a conventional manner.

The processes for preparing the inventive compounds (I) from the salts (VI) or the aldehydes (VII) likewise form part of the subject-matter of the present invention.

Owing to their physical properties, such as the high absorption in the longwave visible region up to the near infrared, the refractive index, the vaporizability under reduced pressure, the solubility in polymer solutions, the thermal and photochemical stability and/or the stable morphology in thin films, the methine dyes (I) are suitable for preparing optical recording media.

The invention also relates to optical recording media comprising a base and a coat of a thermoplastic or crosslinked polymer which contains a dye which is impervious to laser light, wherein the polymer contains at least one methine dye as claimed in claim 1.

The recording systems according to the invention have a very high absorption at the wavelengths of the lasers (for example He-Ne, Nd-glass, Nd-YAG, GaAs, GaAlAs and other suitable semiconductor injection lasers) which are customarily used for recording information. Preference is given to those recording systems which have very high absorption at the emission wavelength of semiconductor lasers from about 750 to 1100 nm.

The polymer layers can be applied to an optically reflective layer in such a way as to produce smooth absorption layers of optical quality suitable for inscribing the information to be stored with a high signal-to-noise ratio.

The structure of recording media is known per se [J. Vac. Sci. Technol. 18 (1) (Jan./Feb. 1981), 105].

A reflective layer can be present between the light-absorbent layer and the base, so that the portion of the incident light which is not absorbed in the colored layer is reflected at the reflector layer and passes once more through the colored layer.

The incident light can also be received through a transparent substrate. A possible layer sequence is then: substrate, absorber and, if desired, reflector.

The reflective layer should be such that the light used for recording and scanning is reflected quantitatively, if possible. Suitable reflective materials are, for example, aluminum, rhodium, gold, tin, lead, bismuth, copper and dielectric mirrors. The thickness of the reflective layer should be such that the light used for recording or scanning is reflected as completely as possible.

Mirrors having a low thermal conductivity are advantageous for this purpose. The reflective (base) layer must have an optically smooth, flat surface, and its surface must be such that the adsorbant layer is formly adherent thereto. To obtain a favorable effect on the surface quality and adhesion phenomena, the base and/or the reflector can be provided with a smoothing coat of a thermoset or thermoplastic material.

Metallic reflective layers are preferably applied in a conventional manner by vapor deposition under reduced pressure or by affixing suitable metal foils to the base. The laser-sensitive layer according to the invention is preferably applied by whirler-coating on dissolved or dispersed dye in the presence of binders. Knife- or dip-coating are likewise eligible methods for preparing the layers.

To apply the absorption layers from solution, a solution or, failing that, a dispersion of the dye or dye mixture and the polymer is prepared in a suitable solvent, such as methylene chloride, chloroform, carbon tetrachloride, acetone, methyl ethyl ketone, cyclohexanone, toluene, acetonitrile, ethyl acetate, methanol or mixtures thereof, and a binder is added, if desired.

The binder can be a radiation- or heat-curable resin, for example a photopolymer, a silicone resin, an epoxy resin or a thermoplastic.

Preference is given to thermoplastics having no or only a very small crystalline domain and glass transition temperatures of above 35° C., in particular above 75° C. Examples of suitable thermoplastics are water-insoluble binders, such as (meth)acrylate polymers and copolymers, polystyrene homopolymers and copolymers, polyvinylcarbazole, polyvinyl ester copolymers, polyvinyl chloride, polyacrylonitrile and cellulose esters.

The dye formulation is then applied by knife- or dip-coating, but preferably by whirler-coating, to a previously cleaned or pre-treated subbing layer, and dried, or cured, in air. The film can also be dried or cured under reduced pressure, at elevated temperature or, if appropriate, with radiation.

Depending on the structure of the system, the dye-in-polymer layer is applied first, followed by the reflector, or vice versa. Interlayers and protective layers or a reflective layer may be dispensed with. If the dye-in-polymer layer does not have adequate mechanical stability, it can be coated with a transparent protective layer. Suitable for this purpose are a whole number of polymers which on application by whirler-coating, knife-coating or dip-coating from solution or by vapor deposition under reduced pressure, in particular in the case of fluorinated polymers, can form a protective layer.

If the (data storage) system is constructed from two identical or different recording media in the form of a sandwich, a protective layer can be dispensed with. In addition to higher mechanical and rotodynamic stability, the sandwich structure offers the advantage of twice the storage capacity.

Protective layers and/or interlayers are dispensable, given adequate quality of the optical recording medium. If interlayers cannot be dispensed with, their thickness must be chosen, having regard to the refractive index of the interlayer material and the laser light wavelengths used, in such a way that no troublesome interference can arise.

The invention is illustrated in more detail by the examples below.

A. 1. GENERAL METHOD FOR PREPARING "PENTAMETHINES"

20 mmol of heteroarylacetonitrile, 20 mmol of 1,1,3,3-tetramethoxypropane and 50 mEq of mineral acid (for example halohydric acid, perchloric acid, sulfuric acid or tetrafluoroboric acid) are gradually heated to the boil in 100 ml of ethylene glycol monoethyl ether. The reaction mixture is maintained at that temperature for about 3 hours and is then gradually cooled down to room temperature, and the precipitated crystalline product is filtered off with suction.

Purification is effected by washing with mineral acid acetonitrile and drying in a desiccator over KOH.

In place of tetramethoxypropane it is also possible to use tetramethoxypropane which are substituted in the 2-position, malonaldehyde or C-substituted malonaldehydes or units of the formula

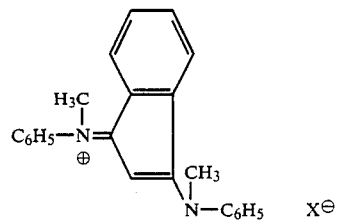

A2. GENERAL METHOD FOR PREPARING "HEPTAMETHINES"

A. 2.1

20 mmol of heteroarylacetonitrile, 10 mmol of Zincke-Aldehyd and 50 mEq of mineral acid are reacted in accordance with the pentamethine method (A 1).

A. 2.2

20 mmol of heteroarylacetonitrile are dissolved with 2 g of finely ground potassium hydroxide in 50 ml of DMF. 10 mmol of König's salt are added at room temperature. The mixture is stirred at room temperature for 3–5 h and poured onto 200 g of ice, 200 ml of water and 20 ml of glacial acetic acid. The precipitate is filtered off with suction, washed with 1N acetic acid and recrystallized from an acetic acid/acetonitrile mixture.

A 2.3

2.2 is repeated, except that the König's salt is replaced by 10 mmol of a pyridium salt.

A 2.4

2.2 is repeated, except that the König's salt is replaced by 10 mmol of compound

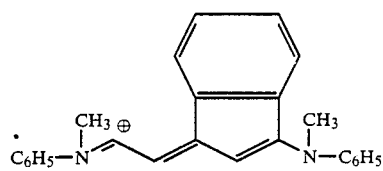

A. 3. GENERAL METHOD FOR PREPARING "NONAMETHINES"

A 2.2 is repeated, except that the König's salt is replaced by dimethyl-(7-dimethylamino-2,4,6-heptatrienylidene)-ammonium tetrachlorozincate. To work up, the reaction solution is poured onto 200 g of ice and 20 ml of 47% strength HBr. The precipitate is filtered off with suction and washed with 1N HBr.

A. 4. GENERAL METHOD FOR PREPARING "UNDECAMETHINES"

A. 3. is repeated, except that the heptatrienylidene compound is replaced by dimethyl-(9-dimethylamino-2,4,6,8-nonatetraenylidene)ammonium tetrachlorozincate.

A. 5. GENERAL METHOD FOR PREPARING PENTAMETHINES (VIII) AND (VIIIa) from salts (VI)

A. 5.1 PREPARATION OF COMPOUNDS OF THE FORMULA (VIII)

20 mmol of acetonitrile derivative are dissolved with 2 g of finely ground potassium hydroxide in 50 ml of DMF. While cooling with ice/water, 20 mmol of a salt of the formula (VI) are added a little at a time by spatula. The reaction mixture is stirred at room temperature for one hour.

ISOLATION AS BASE

After cooling down to room temperature, the reaction mixture is poured onto a thoroughly stirred mixture of 200 g of ice, 200 ml of water and 20 ml of acetic acid. The precipitate is filtered off with suction or centrifuged off and is washed with weakly acetic acid water. Further purification is effected by washing with or recrystallizing from acetonitrile while ensuring that the medium remains weakly acid (acetic acid).

ISOLATION AS HYDROHALIDE

After cooling down to room temperature, the reaction mixture is poured onto a thoroughly stirred mixture of 200 g of ice, 200 ml of water and 20 ml of concentrated hydrochloric acid (or 47% strength hydrobromic acid). The precipitate is filtered off with suction or centrifuged off and washed with 5% strength hydrohalic acid. Further purification is effected by washing with a mixture of hydrohalic acid and acetonitrile. Drying takes place in a desiccator over KOH.

A 5.2 Preparation of compounds of the formula (VIIIa)

3 ml of triethylamine are added to a mixture of 20 mmol of a salt of the formula (VI) and 20 mmol of a cyclammonium compound in 50 ml of dimethylformamide. This is followed by stirring at room temperature for about 2 hours and working up as described under A 5.1.

A. 6. GENERAL METHOD FOR PREPARING HIGHER POLYMETHINES

A. 6.1 PREPARATION OF COMPOUNDS OF THE FORMULA (IX)

20 mmol of a compound of the formula (VI) and 10 mmol of dicarboxylic acid (malonic acid, glutaconic acid, piperiylenecarboxylic acid) are dissolved in 50 ml of dimethylformamide. 2 g of finely ground potassium hydroxide are added at room temperature. The reaction mixture is stirred at room temperature for 4 hours and is worked up as described under A 5.1.

A. 6.2 PREPARATION OF COMPOUNDS OF THE FORMULA (X)

20 mmol of a compound of the formula (VI) and 10 mmol of allyl cyanide are dissolved in 50 ml of dimethylformamide. 2 g of finely ground potassium hydroxide are added at room temperature. The reaction mixture is stirred at room temperature for 4 hours and is worked up as described under A 5.1.

A. 7. GENERAL METHOD FOR PREPARING QUATERNIZED METHINES 2 mmol of the neutral methine are stirred under nitrogen in the absence of moisture in 25 ml of 1,1,1-trichloroethane with 4 mmol of triethyloxonium tetrafluoroborate at from 10° C. to no more than 30° C. for about 16 h. The precipitated crystalline product is filtered off with suction, washed with mineral acid acetonitrile, methanol and ether and dried under reduced pressure.

The method was applied to the neutral methine dye (43), affording the corresponding N-ethylmethinecyanine fluoroborate.

In place of 1,1,1-trichloroethane it is also possible to use anhydrous methylene chloride, nitrobenzene or nitromethane.

The alkylation can also be carried out with trimethyloxonium fluoroborate, affording the corresponding methylammoniumcyanines.

The directions of A 1. to A 4. were followed to prepare the following methine dyes from the corresponding acetonitrile compounds and the $C_3$- to $C_{11}$ units.

DMF=N,N-dimethylformamide
MeCN=acetonitrile

| | Pentamethine dyes | | $[\lambda_{max}]^{\oplus}$ $(= \lambda_{00})$ | $\lambda_{max}$ $(= \lambda_{01}$ and $\lambda_{02})$ | $[\lambda_{max}]^{\ominus}$ $(= \lambda_{90})$ |
|---|---|---|---|---|---|
| (1) | structure | DMF<br>MeCN<br>CHCl$_3$ | 597<br>624 | 528<br>515 | 536<br>543 |
| (2) | structure | DMF<br>MeCN<br>CHCl$_3$ | 603<br>625 | 537<br>544 | 539<br>548 |
| (3) | structure | DMF<br>MeCN<br>CHCl$_3$ | 654<br>663<br>689 | 565<br>555<br>560 | 592<br>582<br>580 |
| (4) | structure | DMF<br>MeCN | 547<br>544 | 500<br>500 | 538<br>533 |
| (5) | structure | DMF<br>MeCN<br>CHCl$_3$ | 537<br>550 | 495 | 524 |

| | | | | |
|---|---|---|---|---|
| (6) 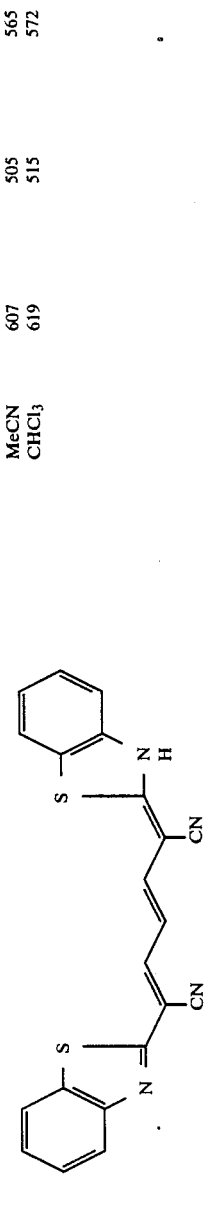 | MeCN<br>CHCl₃ | 607<br>619 | 505<br>515 | 565<br>572 |
| (7) 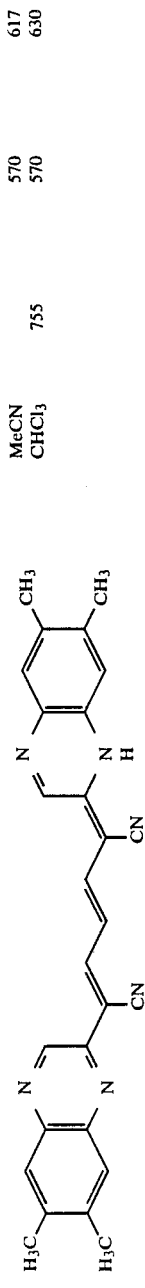 | MeCN<br>CHCl₃ | 755 | 570<br>570 | 617<br>630 |
| (8) 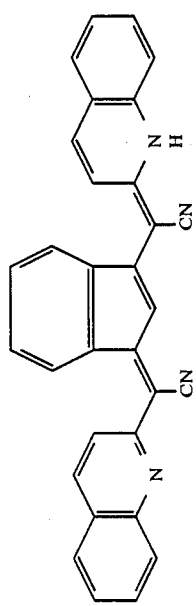 | MeCN<br>CHCl₃ | 760<br>800 | 630<br>630 | 710<br>722 |
| (9) 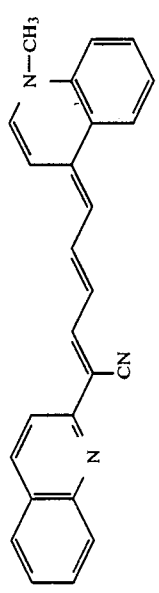 | DMF<br>MeCN<br>CHCl₃ | 693<br>680<br>743 | 630<br>620<br>620 | —<br>—<br>— |
| (10) 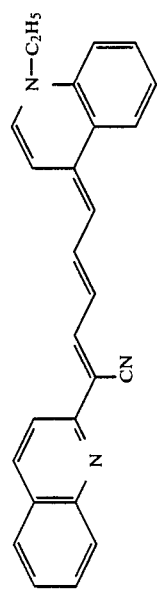 | MeCN<br>CHCl₃ | 685<br>743 | 620<br>625 | —<br>— |

-continued

| | | | | |
|---|---|---|---|---|
| (11) | ![structure with quinoline, CN, N(C2H5), and methylphenyl-CH3] | DMF<br>MeCN<br>CHCl3 | 672<br>665<br>696 | 600<br>595<br>605 | —<br>—<br>— |
| (12) | ![structure with quinoline, CN, N-CH3, and CH3-phenyl] | DMF<br>MeCN<br>CHCl3 | 665<br>658<br>689 | 598<br>593<br>599 | —<br>—<br>— |
| (13) | ![structure with quinoline, CN, N-CH2CH2OH, phenyl] | MeCN<br>CHCl3 | 670<br>696 | 588<br>597 | —<br>— |
| (14) | ![structure with quinoline, CN, NH, HN-phenyl] | DMF<br>MeCN<br>CHCl3 | 619<br>612<br>634 | 540<br>520<br>538 | 577<br>564<br>567 |
| (15) | ![structure with quinoline, CN, NH, H3C-N-phenyl] | DMF<br>MeCN<br>CHCl3 | 610<br>609<br>626 | 530<br>515<br>520 | 564<br>550<br>560 |
| (16) | ![structure with quinoline, CN, S-phenyl, NH] | DMF<br>MeCN<br>CHCl3 | 622<br>628<br>646 | 580<br>575<br>590 | 580<br>563<br>579 |

-continued
| | | | | |
|---|---|---|---|---|
| (17) | 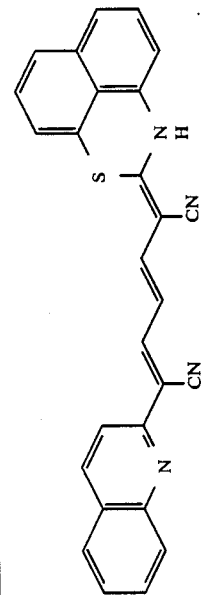 | DMF<br>MeCN<br>CHCl₃ | 610<br>642 | 470<br>475 | 590<br>579<br>587 |
| (18) | 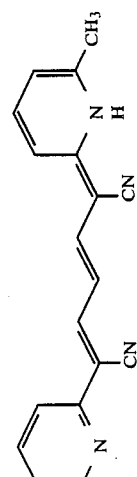 | DMF<br>MeCN<br>CHCl₃ | 595<br>595<br>625 | 540<br>540<br>545 | 535<br>537<br>547 |
| (19) | 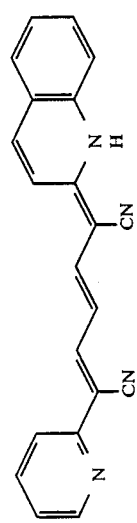 | DMF<br>MeCN<br>CHCl₃ | 623<br>625 | 550<br>545 | 573<br>560 |
| (20) | 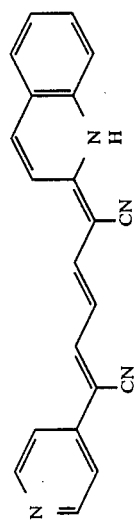 | DMF<br>MeCN<br>CHCl₃ | 638<br>636<br>657 | 555<br>535<br>545 | 575<br>567<br>577 |
| (21) | 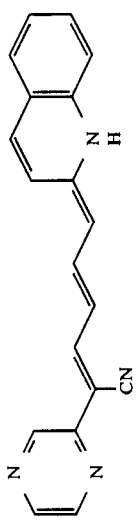 | DMF<br>MeCN<br>CHCl₃ | 660<br>684 | 560<br>555<br>560 | 583<br>571<br>576 |
| (22) | 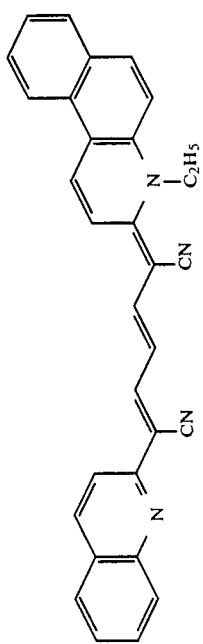 | DMF<br>MeCN<br>CHCl₃ | 673<br>664<br>700 | 620<br>615<br>625 | —<br>—<br>— |
$\lambda_{max}$ -continued
| Heptamethine dyes | | $[\lambda_{max}]^\oplus$ (= $\lambda_{00}$) | (= $\lambda_{01}$ bzw. $\lambda_{02}$) | $[\lambda_{max}]^\oplus$ (= $\lambda_{00}$) |
|---|---|---|---|---|
| (23) | 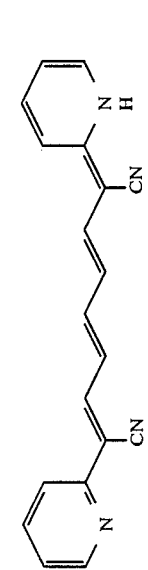 | DMF 695<br>MeCN 698<br>CHCl₃ 719 | 570<br>550 | 639<br>630 |
| (24) | 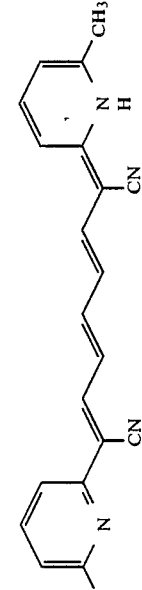 | DMF 711<br>MeCN 699<br>CHCl₃ 729 | 580<br>550 | 641<br>633 |
| (25) | 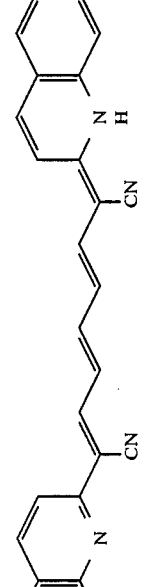 | DMF 778<br>MeCN 775<br>CHCl₃ 790 | 580<br>565<br>550 | 686<br>676 |
| (26) | 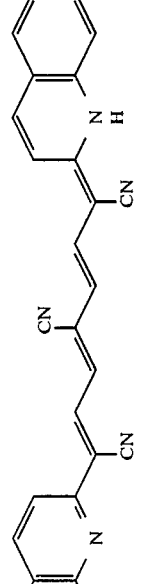 | DMF 810<br>MeCN 807<br>CHCl₃ 830 | 625<br>610<br>615 | 727<br>718<br>737 |
| (27) | 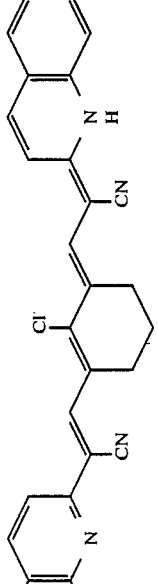 | DMF 795<br>MeCN 795<br>CHCl₃ 802 | 580<br>560<br>555 | 727<br>719 |
| (28) | 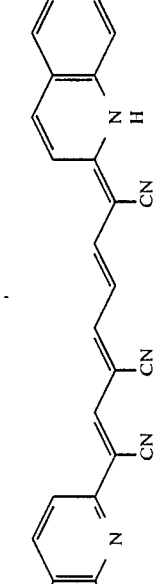 | DMF 710<br>MeCN 713<br>CHCl₃ 739 | 570<br>570<br>580 | 610<br>602<br>616 |

| | | | | |
|---|---|---|---|---|
| (29) | [structure] | DMF<br>MeCN<br>CHCl₃ | 793<br>785<br>795 | 590<br>570<br>575 | 712<br>700<br>715 |
| (30) | [structure] | DMF<br>MeCN<br>CHCl₃ | 810 | 575<br>560<br>575 | 725<br>717<br>745 |
| (31) | [structure] | DMF<br>MeCN<br>CHCl₃ | 708<br>712 | 555<br>526<br>550 | 674<br>664<br>677 |
| (32) | [structure] | DMF<br>MeCN<br>CHCl₃ | 652<br>643<br>655 | 560<br>560<br>570 | 642<br>633<br>640 |
| (33) | [structure] | DMF<br>MeCN<br>CHCl₃ | 725<br>729<br>749 | 555<br>540<br>550 | 665<br>654 |
| (34) | [structure] | DMF<br>MeCN<br>CHCl₃ | 725<br>726<br>744 | 555<br>540<br>550 | 665<br>655<br>672 |

-continued
| | | $[\lambda_{max}]^{\oplus}$ | $\lambda_{max}$ (= $\lambda_{01}$ and | $[\lambda_{max}]^{\ominus}$ |
|---|---|---|---|---|
| (35) 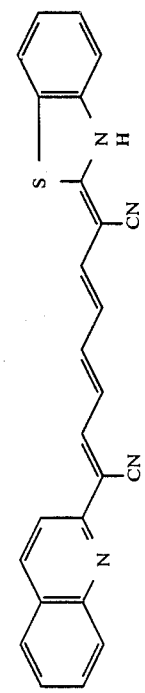 | DMF<br>MeCN<br>CHCl₃ | 750<br>794 | 590<br>565<br>575 | 676<br>667<br>678 |
| (36) 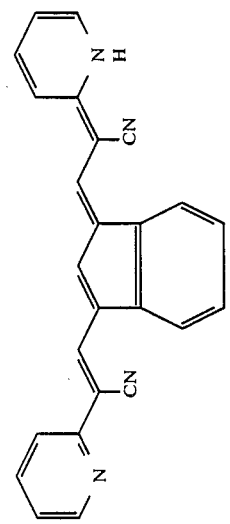 | DMF<br>MeCN<br>CHCl₃ | 710<br>704<br>735 | 640<br>630<br>625 | 630<br>621<br>640 |
| (37) 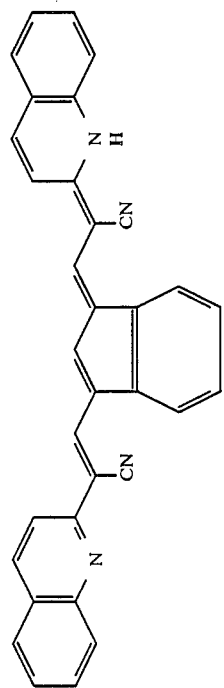 | DMF<br>MeCN<br>CHCl₃ | 738<br>780<br>810 | 650<br>637<br>650 | 669<br>659<br>676 |
| (38) 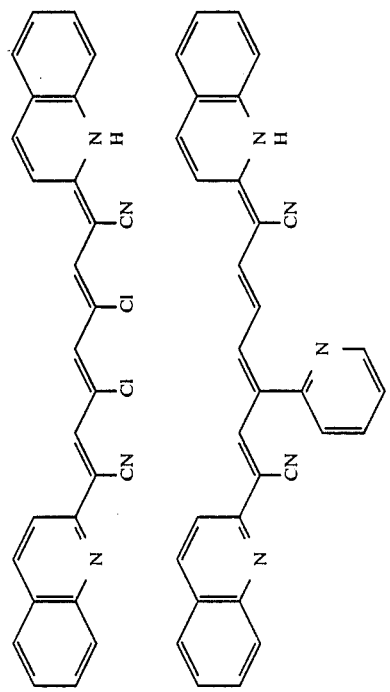 | DMF<br>MeCN<br>CHCl₃ | 764<br>761<br>790 | 605<br>565<br>570 | 673<br>664<br>678 |
| (39) | DMF<br>MeCN<br>CHCl₃ | 730<br>727<br>723 | 590<br>575<br>585 | 633<br>622<br>620 |

-continued

| | | | | ($=\lambda_{00}$) | ($\lambda_{02}$) | ($=\lambda_{00}$) |
|---|---|---|---|---|---|---|
| Nonamethine dyes | | | | | | |
| (40) | | DMF<br>MeCN<br>CHCl₃ | | 736<br>778 | 650 | 653 |
| (41) | | DMF<br>MeCN<br>CHCl₃ | | 765<br>820 | 630 | 675 |
| (42) | | DMF<br>MeCN<br>CHCl₃ | | 809<br>850 | 620 | 695<br>715 |
| (43) | | DMF<br>MeCN<br>CHCl₃ | | 881<br>871<br>910 | 582<br>562<br>570 | 778 |
| Undecamethine dyes | | | $[\lambda_{max}]^{\oplus}$<br>($=\lambda_{00}$) | | $\lambda_{max}$<br>($=\lambda_{01}$ and $\lambda_{02}$) | $[\lambda_{max}]^{\oplus}$<br>($=\lambda_{00}$) |
| (44) | | DMF<br>MeCN | 1000 | | 590<br>560 | 915<br>870 |

PREPARATION OF THE OPTICAL RECORDING MEDIUM

Two 1.2 mm thick polycarbonate disks having a diameter of 120 mm and a central hole diameter of 15 mm are cleaned with alcohol and coated under clean room conditions with an 0.3 μm thick smoothing layer of photopolymer. After curing the photopolymer with UV light, a solution of dye (43) (=dye III. 108) and 1.3 g of a copolymer of methyl methacrylate/methacrylate acid (70:30) in 200 ml of ethyl acetate was whirler-coated at 4800 r.p.m. onto the disks. After drying the layer thickness was 0.26 μm. In a vacuum vapor deposition apparatus an aluminum mirror was applied to the dye layer in a thickness of 0.03 μm, and was in turn whirler-coated with a 1.2 μm thick protective layer of polystyrene from xylene.

The two disks are adhesively bonded together like a sandwich with the coated sides facing inward but held apart by suitable spacer rings in such a way that an air gap of 0.4 mm remains. Using an AlGaAs laser ($\lambda = 820$ nm) mounted on a turntable, individual, approximately 1 μm sized holes are inscribed in the active layer. The sensitivity of the layer is better than 1 nJ/hole; on reading the dots an excellent signal/noise ratio was observed.

We claim:

1. A methine dye having the formula:

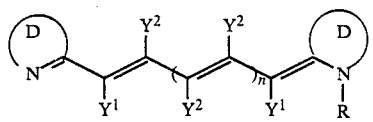

or the tautomeric forms thereof, where each $Y^1$ is the same or different and is selected from the group consisting of cyano, trifluoromethyl, nitro, carbo-$C_1$-$C_{12}$-alkoxy, phenylsulfonyl or phenylsulfonyl which is monosubstituted or disubstituted by $C_1$-$C_{12}$-alkyl, $C_1$-$C_{12}$-alkoxy, chlorine, bromine, fluorine, and cyano, $Y^2$ is in each case, independently of the other, hydrogen, cyano, chlorine, bromine, fluorine, $C_1$-$C_6$-alkyl, $C_5$-$C_7$-cycloalkyl, phenyl, or pyridyl, R is hydrogen, $C_1$-$C_{20}$-alkyl, $C_7$-$C_{10}$-aralkyl or β-hydroxyethyl, and n is 1, 2, 3, 4, 5 or 6, and the groups

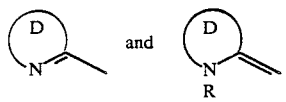

are identical or different and are selected from the group consisting of

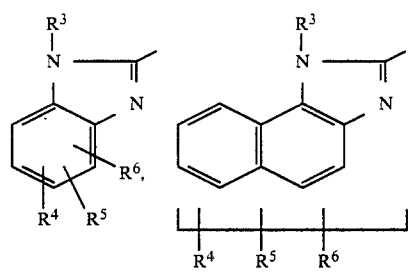

-continued

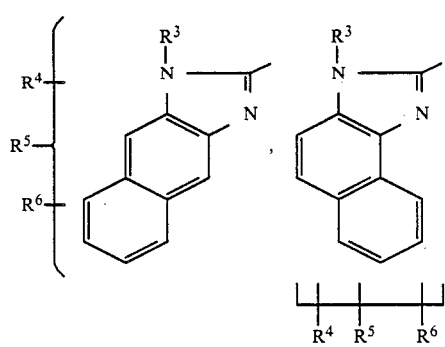

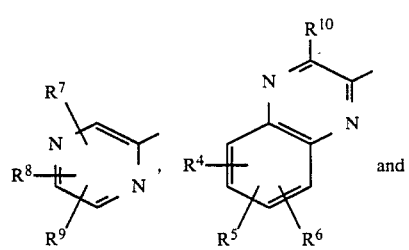

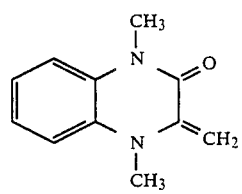

or one

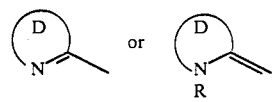

is

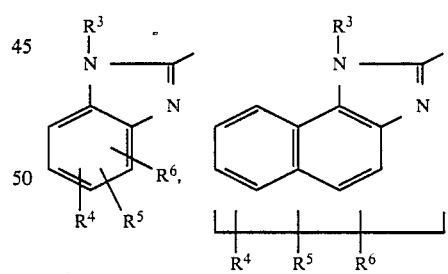

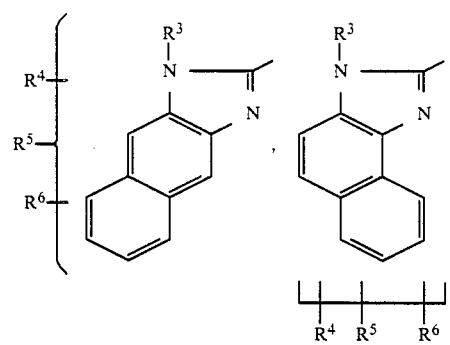

-continued-

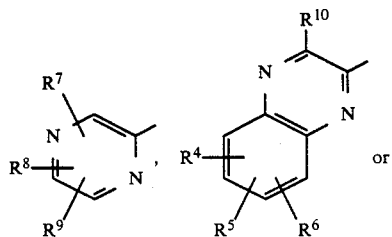

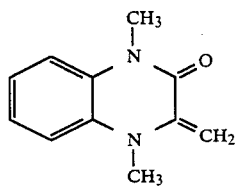

and the other radical D is selected from the group consisting of

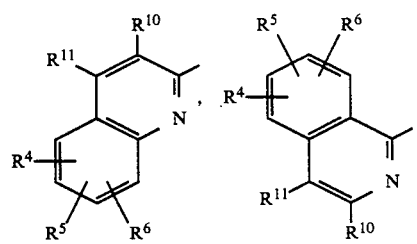

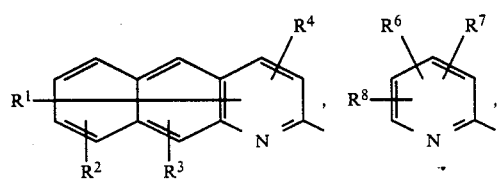

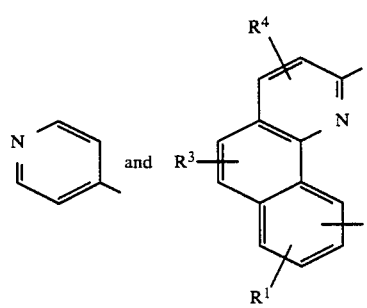

wherein $R^1$-$R^9$, $R^{10}$ and $R^{11}$ independently of one another are each hydrogen, chlorine, bromine, fluorine, —CN, —CF$_3$, nitro, $C_1$-$C_4$-alkyl, $C_1$-$C_4$-alkoxy, unsubstituted phenyl or phenyl substituted by chlorine, bromine, fluorine, $C_1$-$C_4$-alkyl, $C_1$-$C_4$-alkoxy, —CN, —CF$_3$ or —NO$_2$, only one nitro group being present per radical D.

2. A methine dye according to claim 1, wherein $Y^1$ is cyano.

3. A methine dye according to claim 1, wherein the number of substituents on D is, per D, 0, 1 or 2.

4. A methine dye according to claim 1, wherein said D groups are identical or different and are of the formula

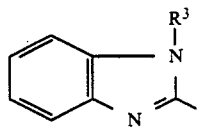

where $R^3$ is —H, —CH$_3$, —C$_2$H$_5$, —n—C$_4$H$_9$, —C$_8$H$_{17}$, —C$_{12}$H$_{25}$, —C$_{16}$H$_{35}$, —C$_{18}$H$_{37}$ or —C$_{20}$H$_{41}$.

5. A methine dye according to claim 1, wherein said D groups are identical or different and are of the formula

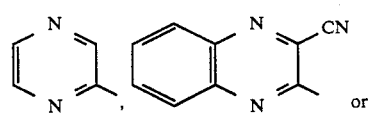

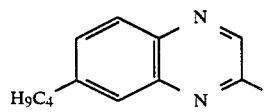

6. A methine dye according to claim 1, wherein one of said D groups is of the formula

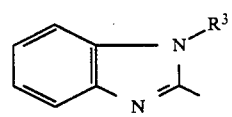

and the other D group is selected from the group consisting of

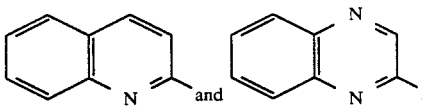

7. A methine dye according to claim 1, which is

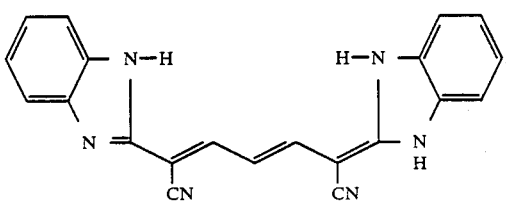

8. A methine dye according to claim 1, which is

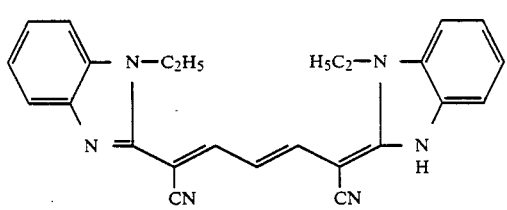

9. A methine dye according to claim 1, which is

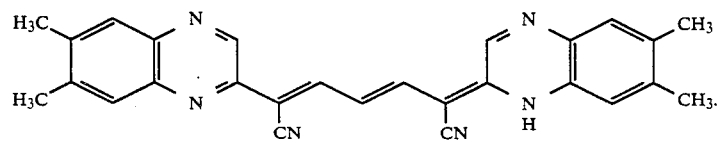
10. A methine dye according to claim 1, which is
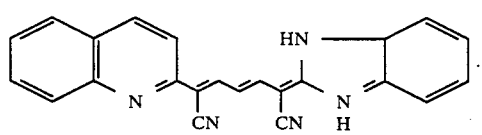
11. A methine dye according to claim 1, which is
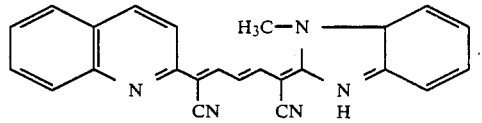
12. A methine dye according to claim 1, which is
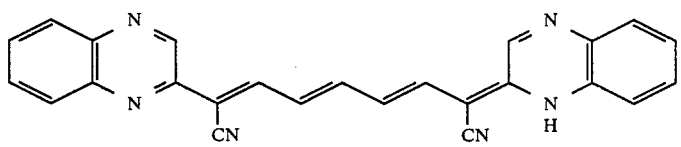
13. A methine dye according to claim 1, which is
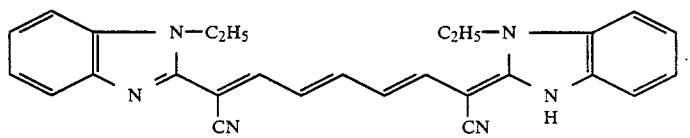
* * * * *